(12) United States Patent
Litvin et al.

(10) Patent No.: US 9,665,953 B2
(45) Date of Patent: May 30, 2017

(54) EFFICIENT QUASI-EXACT 3D IMAGE RECONSTRUCTION ALGORITHM FOR CT SCANNERS

(75) Inventors: Andrew Litvin, Wakefield, MA (US); Ram Naidu, Newton, MA (US)

(73) Assignee: Analogic Corporation, Peabody, MA (US)

(*) Notice: Subject to any disclaimer, the term of this patent is extended or adjusted under 35 U.S.C. 154(b) by 785 days.

(21) Appl. No.: 13/318,653

(22) PCT Filed: Jun. 30, 2009

(86) PCT No.: PCT/US2009/049138
§ 371 (c)(1),
(2), (4) Date: Feb. 17, 2012

(87) PCT Pub. No.: WO2011/002442
PCT Pub. Date: Jan. 6, 2011

(65) Prior Publication Data
US 2012/0170822 A1    Jul. 5, 2012

(51) Int. Cl.
G06K 9/00    (2006.01)
G06T 11/00   (2006.01)

(52) U.S. Cl.
CPC ....... *G06T 11/006* (2013.01); *G06T 2211/416* (2013.01); *G06T 2211/421* (2013.01)

(58) Field of Classification Search
None
See application file for complete search history.

(56) References Cited

U.S. PATENT DOCUMENTS

| 7,058,156 B2 | 6/2006 | Bruder et al. |
| 2004/0179643 A1 | 9/2004 | Gregerson et al. |
| 2005/0094761 A1* | 5/2005 | Hagiwara ............ A61B 6/032 378/15 |
| 2006/0018439 A1 | 1/2006 | Tang et al. |
| 2006/0067457 A1 | 3/2006 | Zamyatin et al. |
| 2006/0067464 A1* | 3/2006 | Clinthorne et al. ............ 378/38 |

(Continued)

FOREIGN PATENT DOCUMENTS

| EP | 1542166 | 6/2005 |
| JP | H11-347027 | 12/1999 |

(Continued)

OTHER PUBLICATIONS

Bontus et al., EnPIT: Filtered Back-Projection Algorithm for Helical CT Using an n-Pi Acquiisition, IEEE Transactions on Medical Imaging, 24:977-986 (2005).

(Continued)

*Primary Examiner* — Hadi Akhavannik
(74) *Attorney, Agent, or Firm* — McDermott Will & Emery LLP

(57) ABSTRACT

A CT scanner comprises: at least one source of X-rays and a multi-row detector array of arbitrary geometry, both supported so as rotate around an axis of rotation during a scan of an object translated along the axis, wherein data for each detector is generated as a function of the X-ray energy received; and a data processor configured so as to perform resampling of the data onto curves in a virtual detector array. The curves project onto tilted lines in a virtual flat detector as to enable tangential filtering of the data.

12 Claims, 25 Drawing Sheets

2 options for conventional geometry:
1) Flat detector (equispatial)
2) Cylindrical detector (equiangular)

Number of detectors, given the detector width at the center "d" and half-fan angle "α":
1) Flat detector:
$N_1 = 2\tan(\alpha) R_{sd}/d$
2) Cylindrical detector
$N_2 = 2\alpha R_{sd}/d$
$N_2/N_1 = \alpha/\tan(\alpha) < 1$ Virtual Flat detector array 224
Virtual cylindrical detector array 226
Physical detector array 220

Flat detector: sampling angle is smaller than at center

For the same FOV and same sampling interval at the detector center, cylindrical detector scheme requires less samples than flat detector scheme (20% for α=45)

(56) References Cited

U.S. PATENT DOCUMENTS

| | | | |
|---|---|---|---|
| 2006/0257010 A1* | 11/2006 | George et al. | 382/131 |
| 2007/0019776 A1 | 1/2007 | Bontus et al. | |
| 2007/0071159 A1 | 3/2007 | Hsieh et al. | |
| 2009/0060309 A1 | 3/2009 | Tsujii et al. | |
| 2009/0074278 A1* | 3/2009 | Beaulieu et al. | 382/131 |
| 2009/0116721 A1 | 5/2009 | Zamyatin et al. | |

FOREIGN PATENT DOCUMENTS

| | | |
|---|---|---|
| JP | 2005536308 | 12/2005 |
| JP | 2006-95297 | 4/2006 |
| JP | 2007-101247 | 4/2007 |
| JP | 200956032 | 3/2009 |
| JP | 2009-112816 | 5/2009 |
| WO | 2004019782 | 3/2004 |

OTHER PUBLICATIONS

Office Action dated Nov. 20, 2015 from corresponding German Application No. 112009005019.0.

Tang et al., "A Three-Dimensional-Weighted Cone Beam Filtered Backprojection (CB-FBP) Algorithm for Image Reconstruction in Volumetric CT-Helical Scanning," Physics in Medicine and Biology, 51(4):855-874 (2006).

Feldkamp et al., "Practical Cone-Beam Algorithm," Journal of the Optical Society of America, 1:612-619 (1984).

Hein et al., "Double-Centering Method for Increasing Efficiency of Cone-Beam X-ray CT Reconstruction," IEEE Nuclear Science Symposium Conference Record, San Diego, CA Nov. 4-10, 2001, the whole document.

International Search Report and the Written Opinion from corresponding PCT Application No. PCT/US2009/049138 dated Aug. 5, 2010.

Sourbelle et al., "Generalization of Feldkamp Reconstruction for Clinical Spiral Cone Beam CT," Proceedings of the 7th International Conference on Fully 3D Reconstruction in Radiology and Nuclear Medicine, the whole document (2003).

Tang et al., "A Three-Dimensional-Weighted Cone Beam Filtered Backprojection (CB-FBP) Algorithm for Image Reconstruction in Volumetric CT-Helical Scanning; A Three-Dimensional-Weighted Cone Beam Filtered Backprojection (CB-FBP) Algorithm," Physics in Medicine and Biology, 51:855-874 (2006).

Turbell et al., "Helical Cone-Beam Tomography," International Journal of Imaging Systems and Technology, 11:91-100 (2000).

* cited by examiner

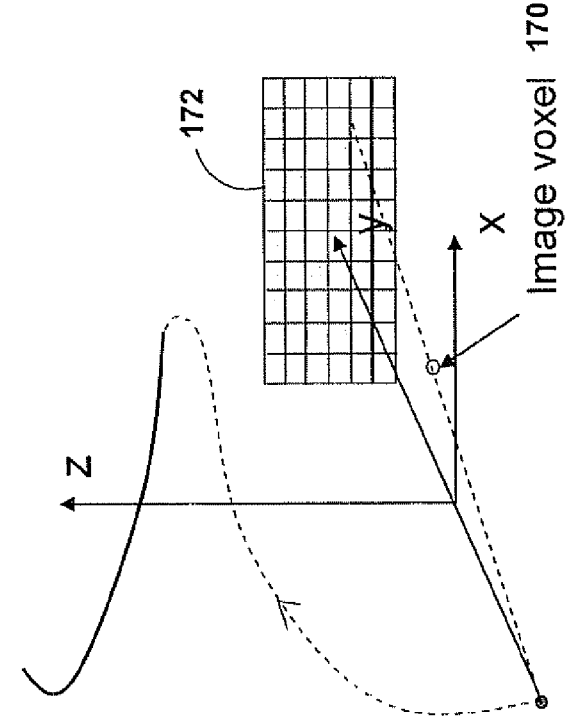

2D reconstruction 1) 1D parallel projections for tilted planes are extracted.
   Approximation: One approximated parallel projection is used for *all* voxels in the tilted plane.
2) Parallel projection are filtered
3) 2D back-projection used to reconstruct on tilted planes using set of 1D parallel data for a given tilted plane

FIG. 5(A)

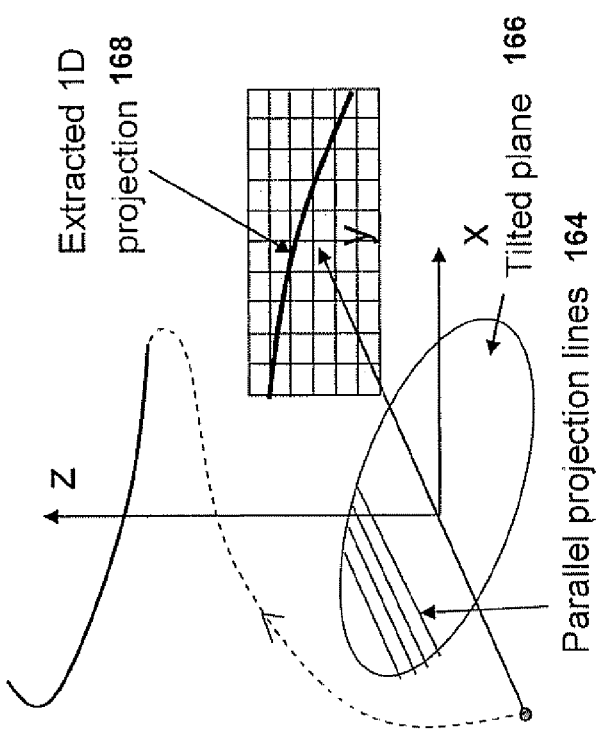

3D reconstruction

Voxels are individually and exactly projected directly in 3D space onto the detector array

FIG. 5(B)

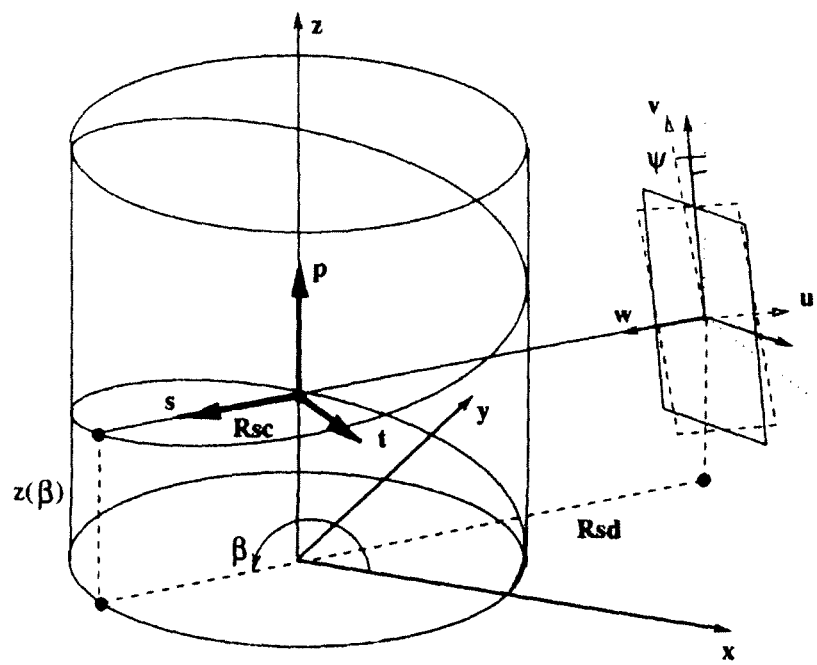
15(A)
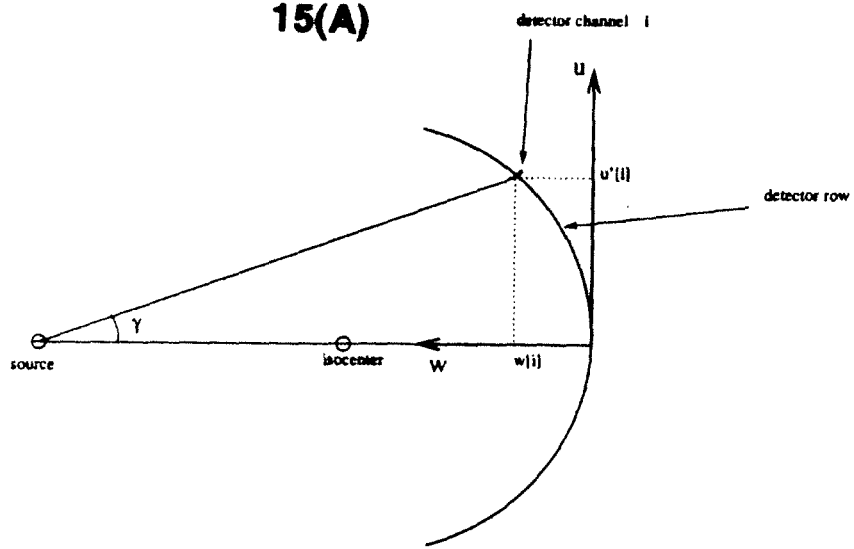
15(B)
FIG. 15

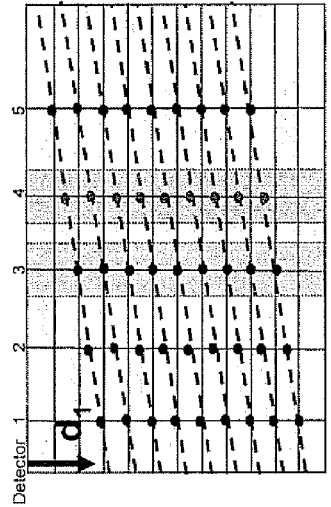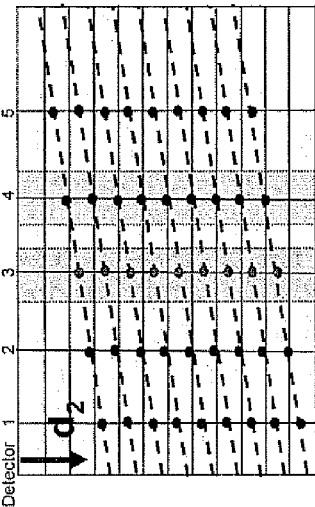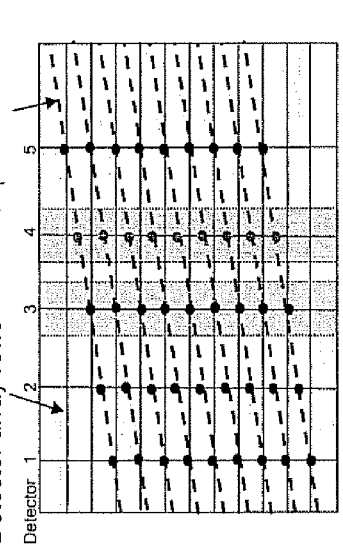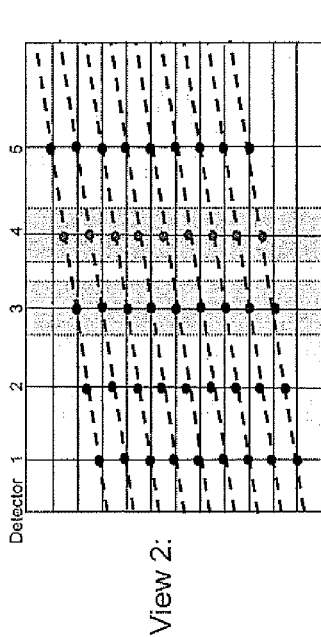
FIG. 20(A) FIG. 20(B)

EFFICIENT QUASI-EXACT 3D IMAGE RECONSTRUCTION ALGORITHM FOR CT SCANNERS

FIELD OF THE DISCLOSURE

The present disclosure relates to computed tomography (CT) scanning, and more particularly to a CT scanner and image reconstruction technique that employs a process that is capable of (1) processing CT data derived from any arbitrary beamline geometry, (2) reducing artifacts if the scanner has a large field of view, and (3) improving image quality while simultaneously enabling an efficient accelerated implementation on hardware.

BACKGROUND OF THE DISCLOSURE

Image reconstruction processes for helical CT scanning are classified into 2D and 3D processes. 2D processes [see Defrise, M., Noo, F., and Kudo, H., "Rebinning-based algorithms for helical cone-beam CT", Phys. Med. Biol. 46, 2001] estimate parallel tomographic datasets for tilted slices, perform 2D backprojection in each of the tilted slices and reconstruct the volume slice by slice. For 2D processes, geometrical (cone-beam) artifacts increase with the cone-angle (angular extent of the detector in the direction orthogonal to the plane of the gantry rotation). 3D processes reconstruct voxels in the volume directly from projection data without conversion of the backprojection task to intermediate 2D problems. For a given cone angle, images reconstructed with 3D processes generate reduced cone-beam artifacts when compared with images reconstructed with 2D processes.

Traditionally, medical and security CT scanners utilize 2D backprojection reconstruction processes for helical CT due to their ease of implementation, computational efficiency and robustness. New CT scanners increasingly require fast scan speeds and detectors with larger cone-angles, which leads to unsatisfactory level of image artifacts if 2D processes are used to reconstruct images. In order to increase the scanning speed and maintain or improve image quality, it is necessary to transition from using 2D to 3D processes to reconstruct images.

A number of exact and approximate 3D image reconstruction processes have been proposed in the literature. The most widely used 3D approximate process is the Feldkamp Davis Kress (FDK) process, originally proposed in Feldkamp, L. A., Davis, L. C., and Kress, J. W., "Practical cone-beam algorithm", J. Opt. Soc. Am., Vol. 1 No. 6, 1984, for the case of an axial scan. This process is popular due to its relative ease of implementation, stability and tractable properties. The extension of the FDK process to helical scanning was first proposed in Wang, G., Lin, T., Cheng, P., and Schiozaki, D. M., "A general cone-beam reconstruction algorithm", IEEE Trans. Med. Imaging, 12, 1993.

The original helical FDK process results in a relatively high level of cone-beam artifacts. Two key enhancements proposed in the literature greatly improve Image Quality and transform the helical FDK into a "quasi-exact" process. First, the tilted plane reconstruction approach described in Yan, M., and Zhang, C., "Tilted plane Feldkamp type reconstruction algorithm for spiral cone beam CT", Med. Phys. 32 (11), 2005 reduces image artifacts by reducing the mathematical inconsistency between rays used to reconstruct a given voxel. Second, filtering data along lines aligned with the source trajectory (tangential filtering) [Sourbelle, K., and Kalender, W. A., Generalization of Feldkamp reconstruction for Clinical Spiral Cone-Beam CT] significantly reduces cone-beam artifacts. The tangential filtering is derived as an approximation to exact reconstruction processes (such as proposed in Katsevich, A., "An improved exact filtered backprojection algorithm for spiral computed tomography", Advances in Applied Mathematics, 32, 2004) and modifies the FDK process to be "quasi-exact".

The quasi-exact version of the helical FDK process as described above is an attractive choice for the modern CT scanner. However, there exist at least three limitations that inhibit implementation of such a process on CT scanners.

1) The FDK processes in the literature are designed for flat or cylindrical detector arrays, which may not be applicable to modern CT scanning systems with unconventional beamline geometry (non-flat, non-cylindrical detector arrays of various geometric (sometimes arbitrary) shapes and with non-uniformly spaced detectors). The quasi-exact FDK process as described in [Kudo, H., Noo, F., and Defrise, M., "Cone-beam filtered-backprojection for truncated helical data", Phys. Med. Biol. 43, 1998] is only applicable to a flat detector geometry. Therefore, the use of non-conventional detector geometry requires special treatment.
2) The FDK processes in the literature generate aliasing artifacts in scanning systems with large fields of view (FOV) due to the increase in the sampling interval of voxel locations as projected on the detector array with increasing distance from the center of the FOV.
3) The computational complexity of 3D processes is significantly higher than that of 2D processes. Therefore, an efficient process and numerical implementation in combination with a suitable hardware platform are required. In particular, processes and their numerical implementations must be aligned with reconstruction time requirements given the hardware platform.

GENERAL DESCRIPTION OF THE DRAWINGS

Figure 6:
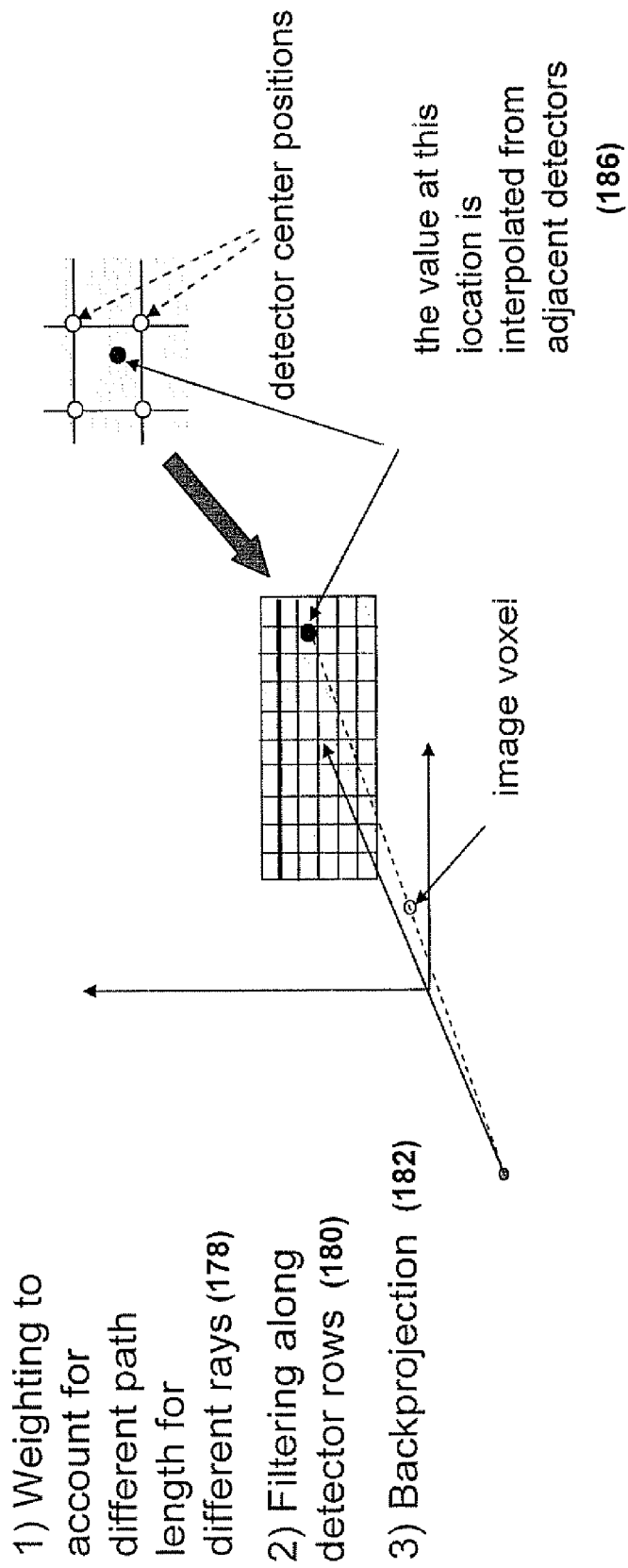
Figure 7:
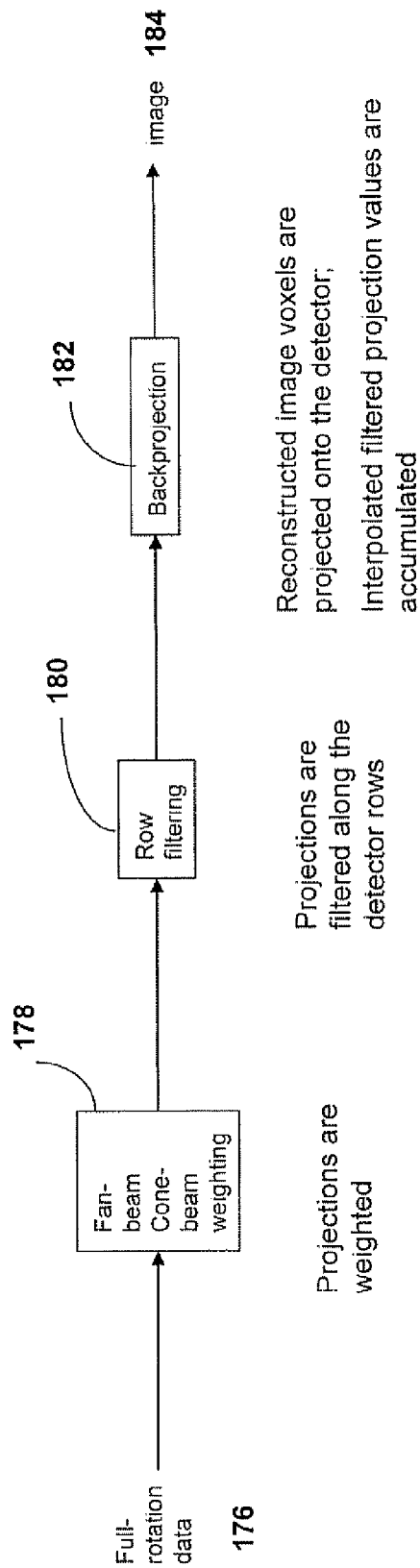
Figure 9:
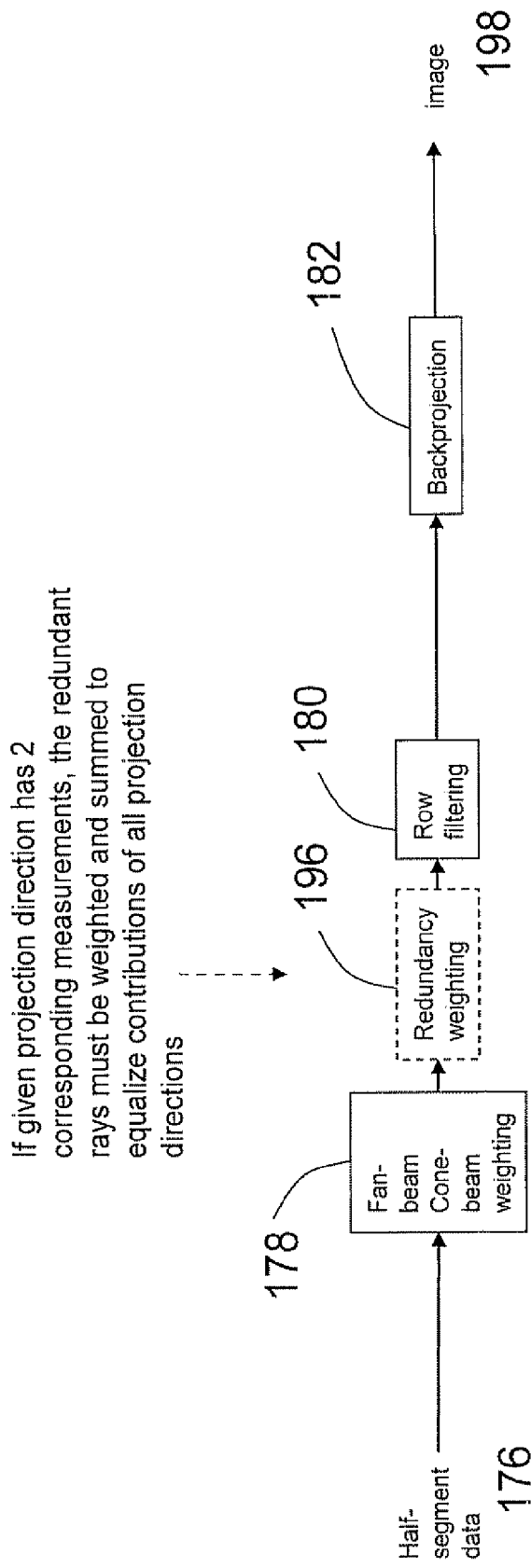
Figure 10:
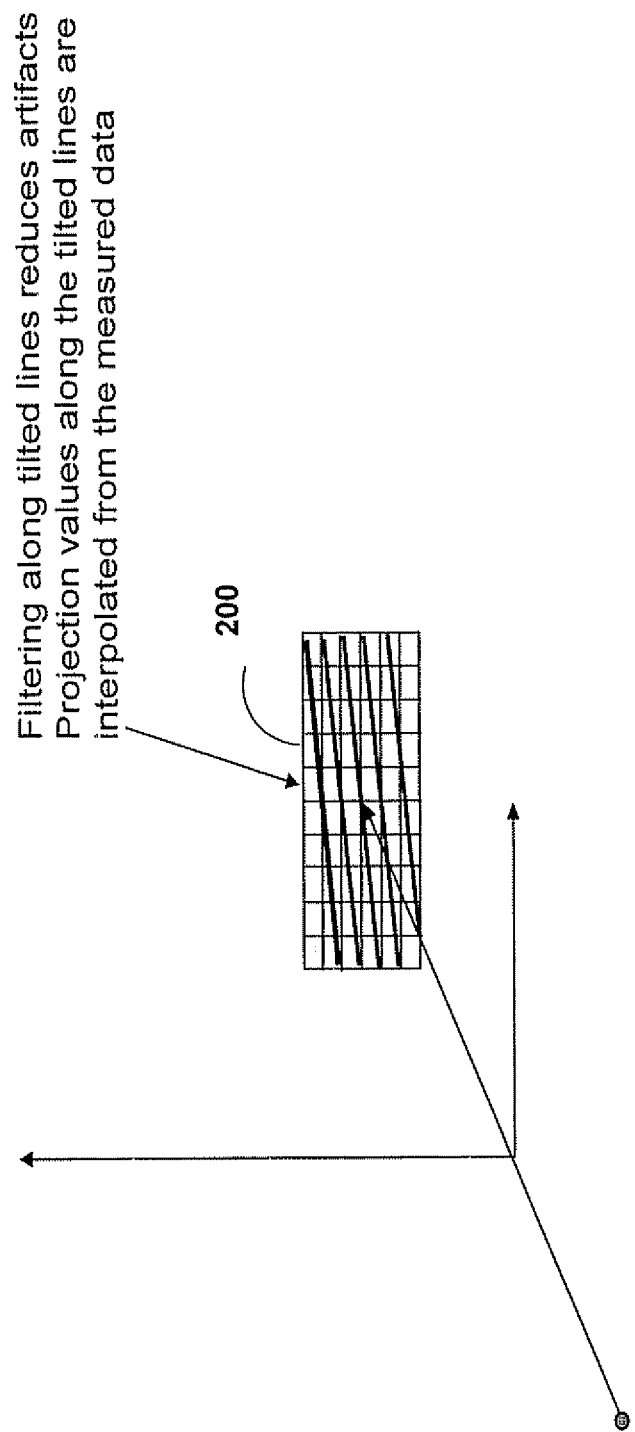
Figure 11:
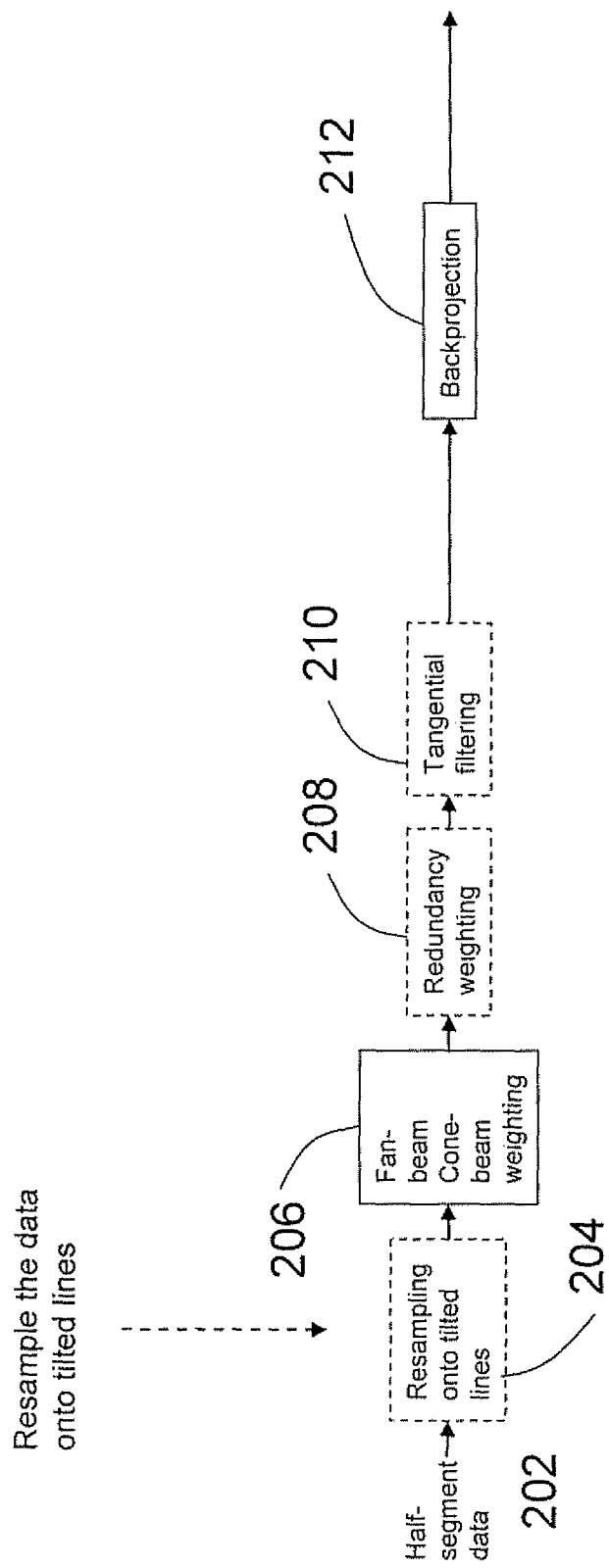
Figure 12:
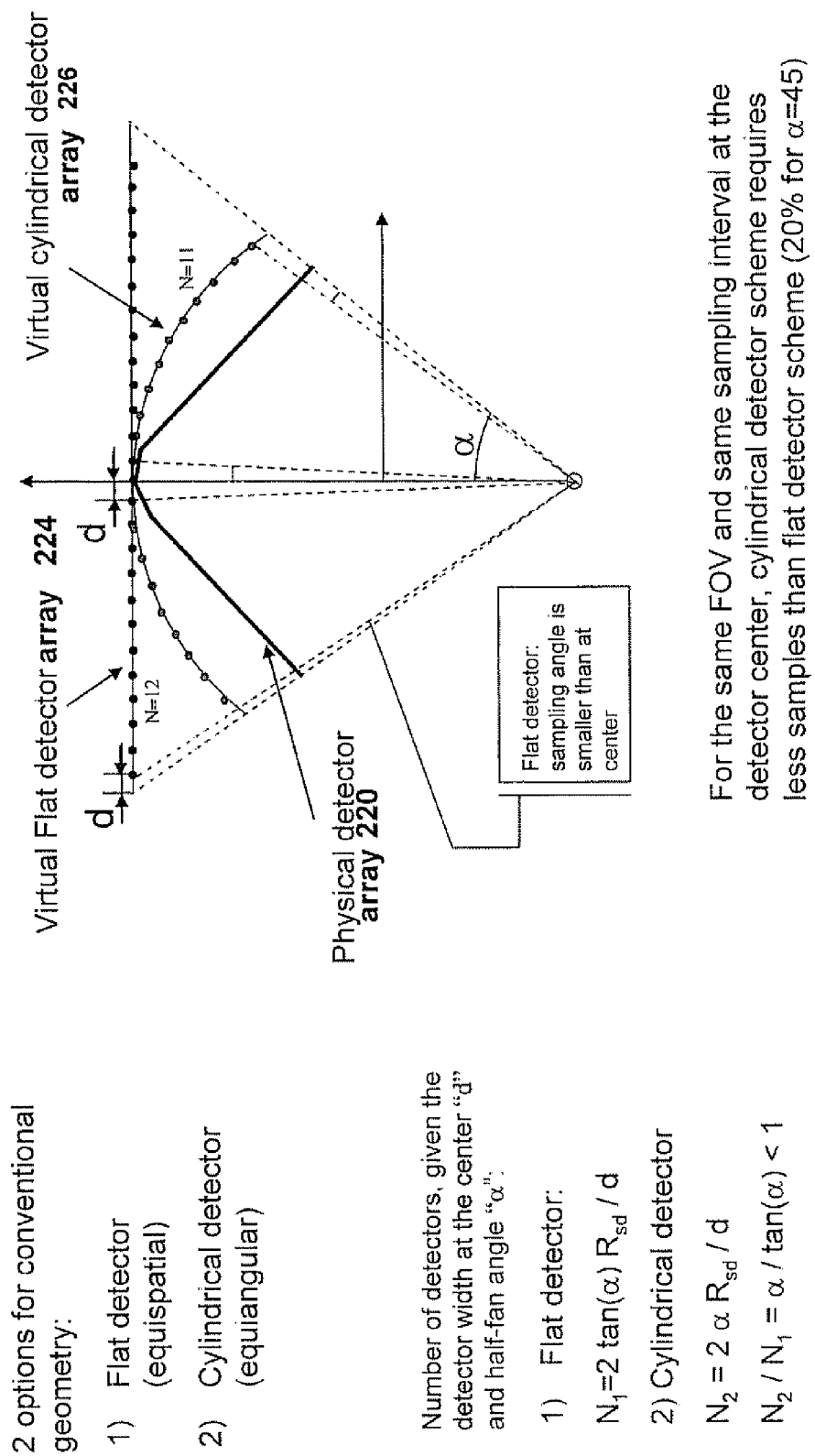
Figure 13:
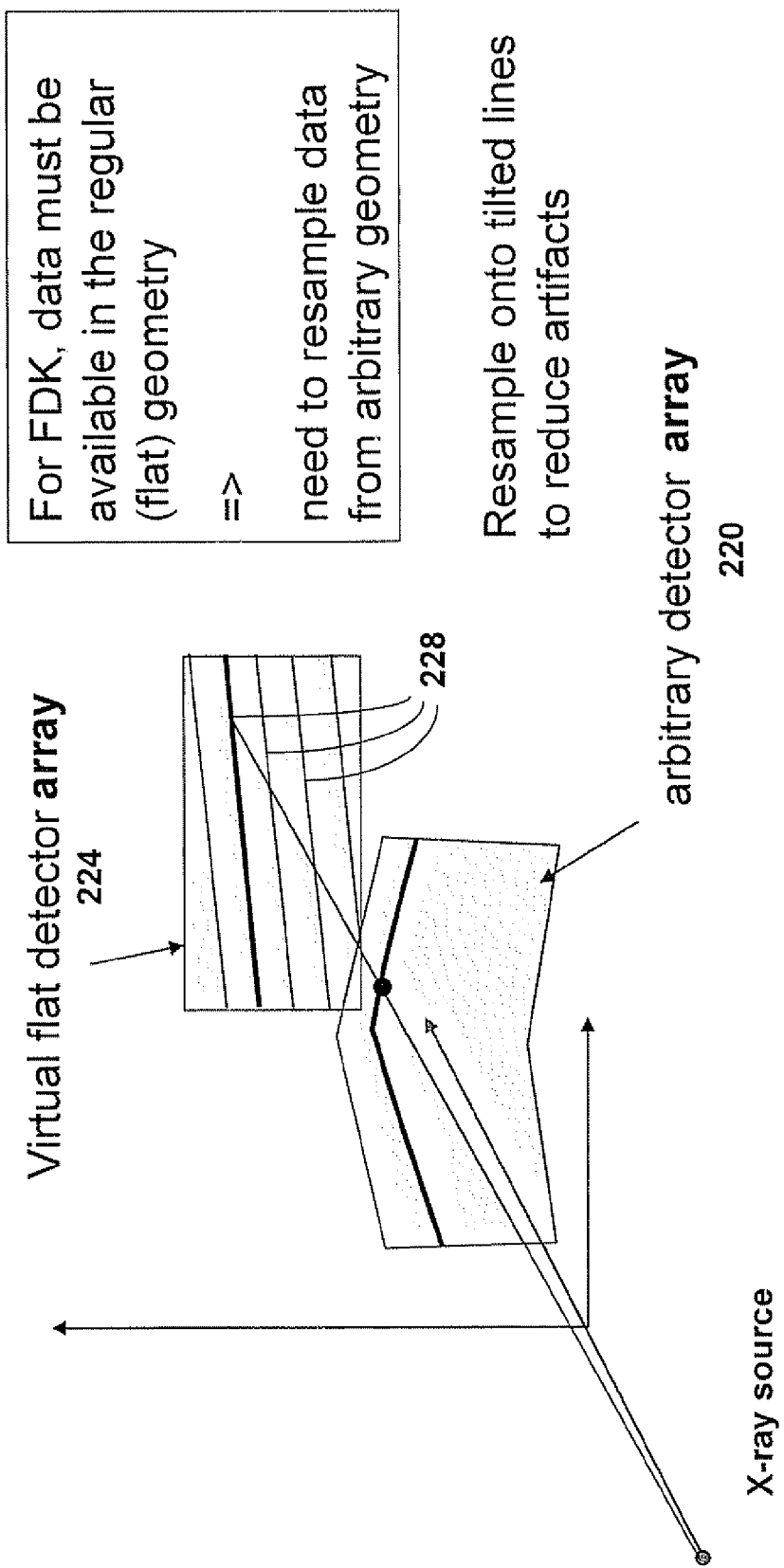
Figure 14:
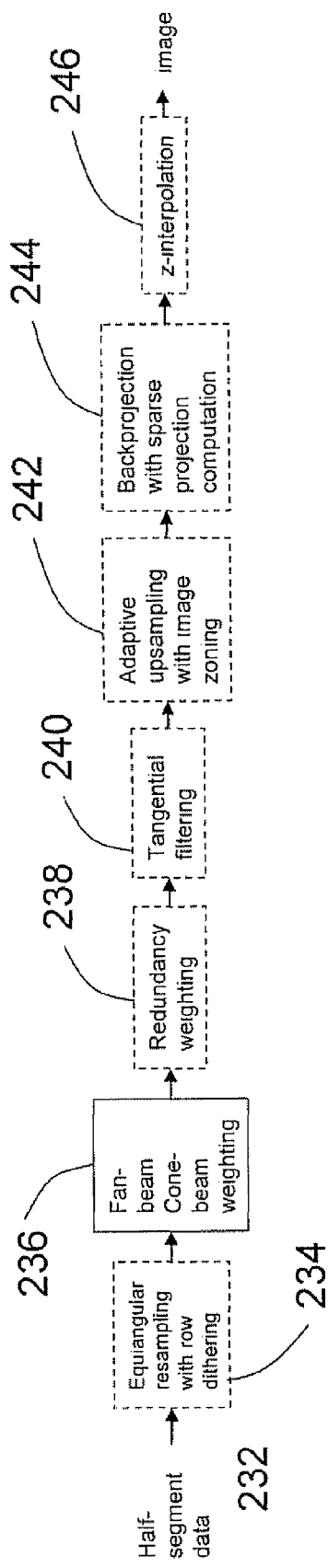
Figure 16:
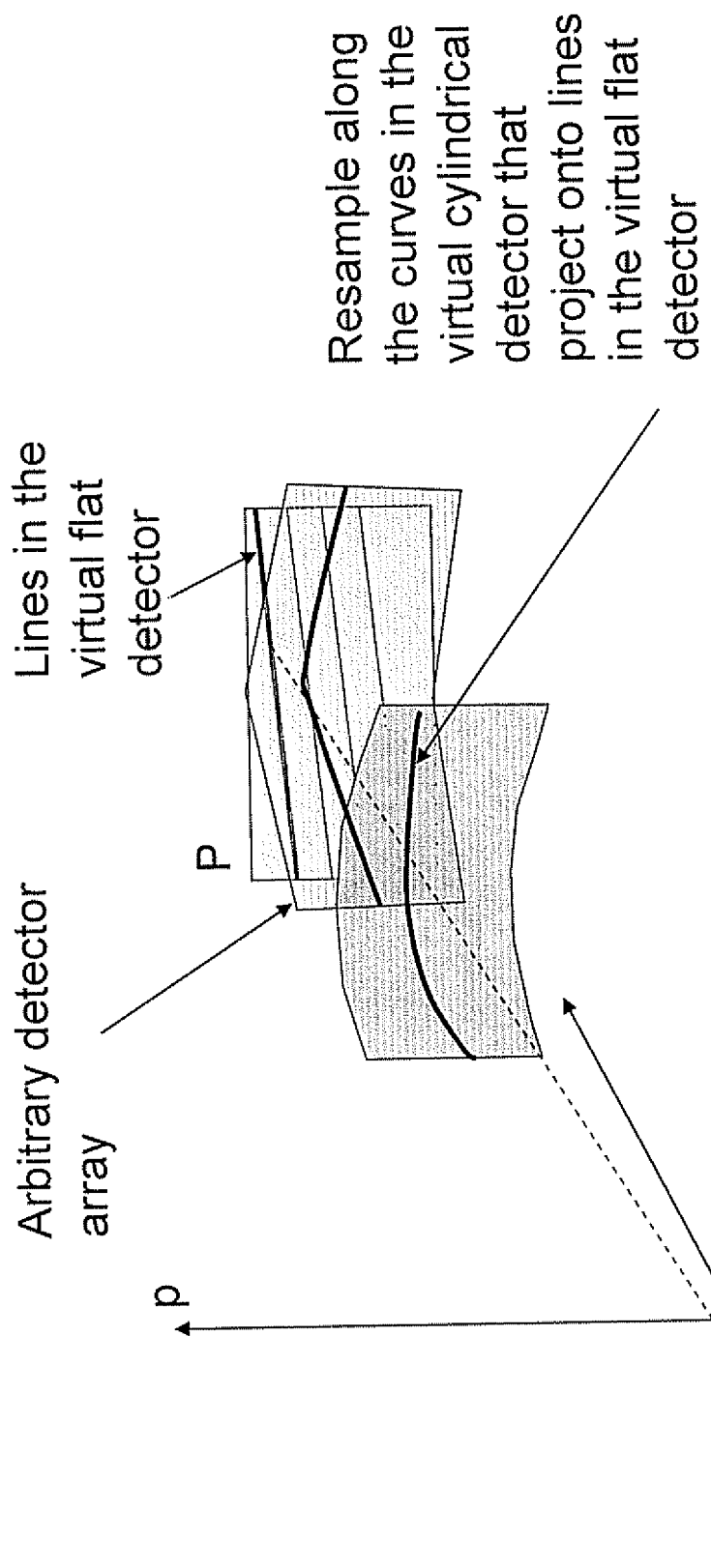
Figure 17:
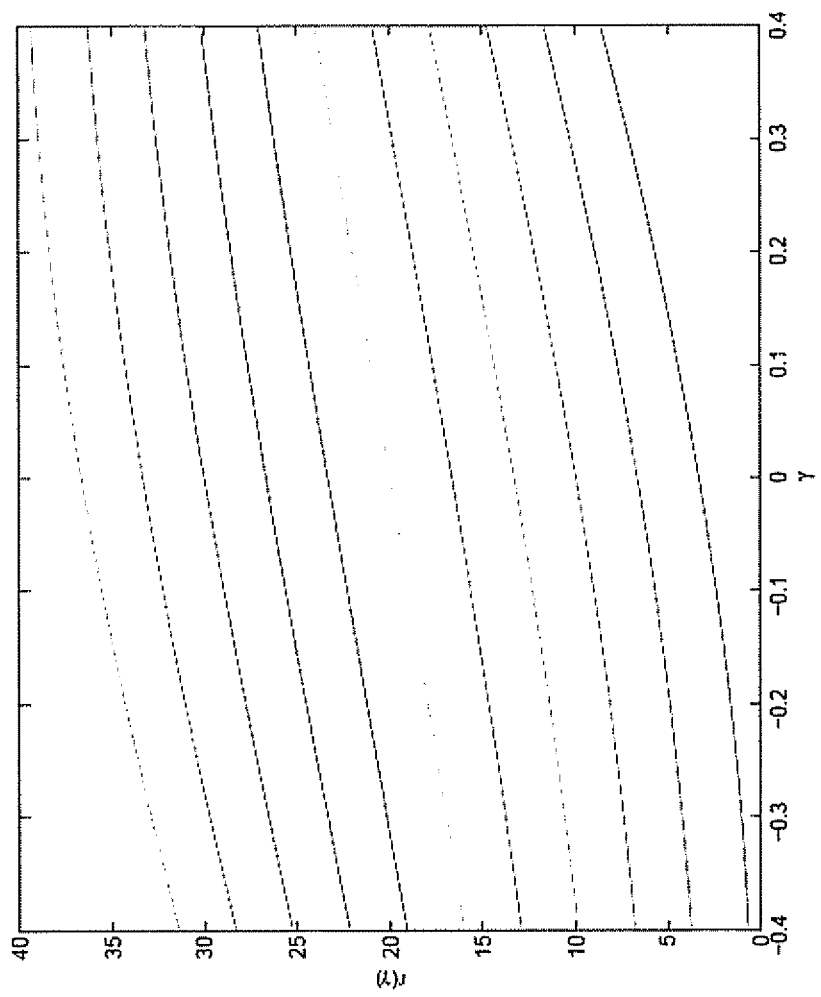
Figure 18:
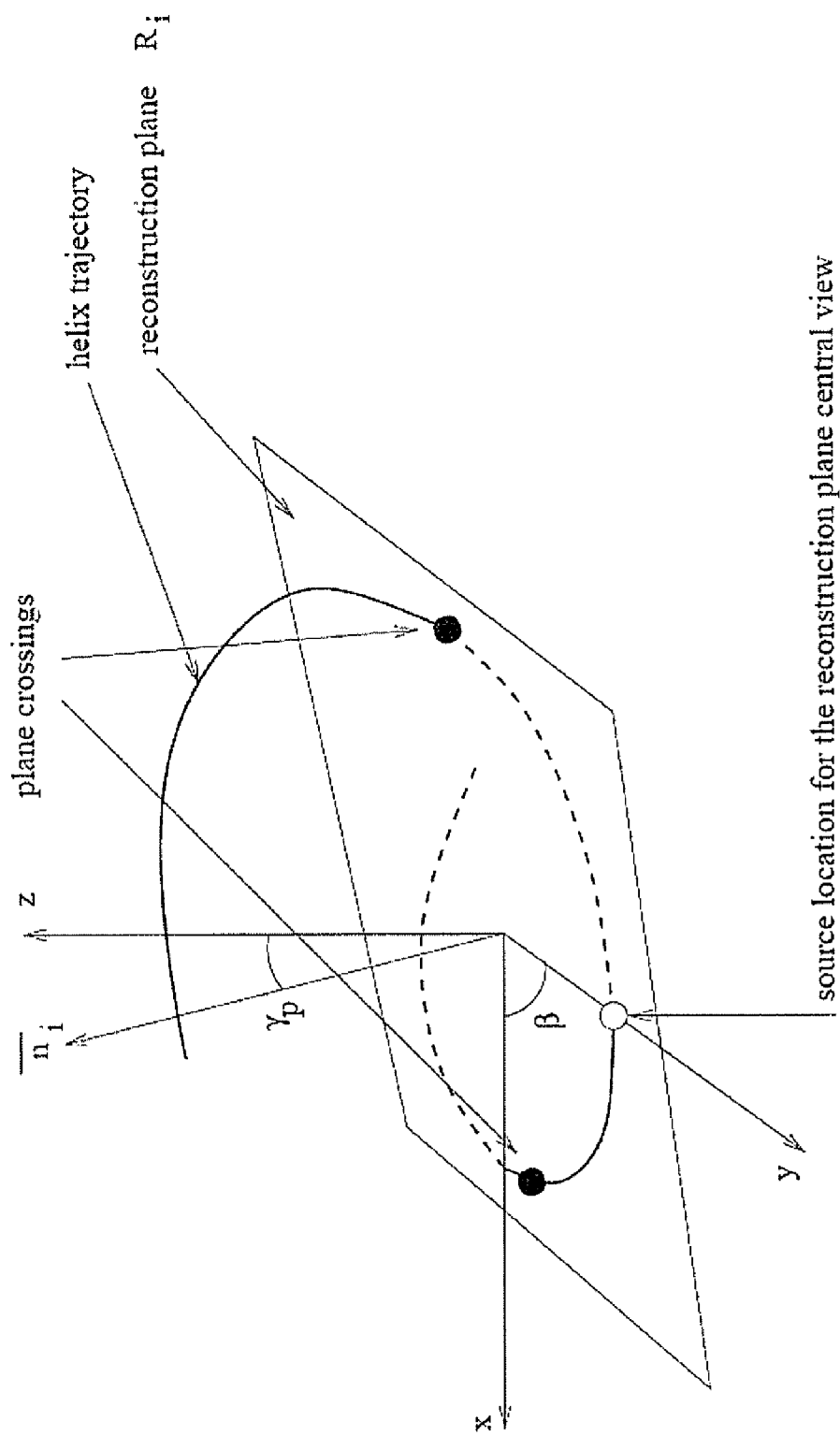
Figure 19:
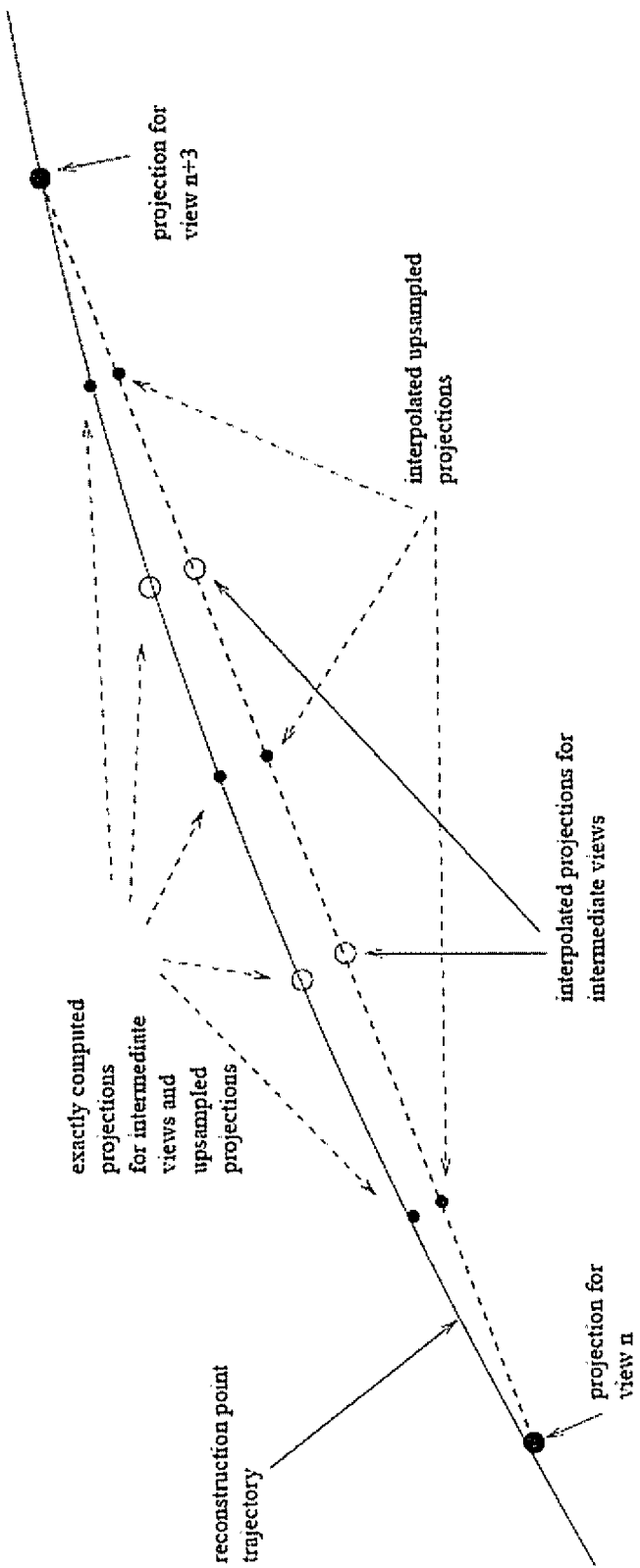
Figure 21:
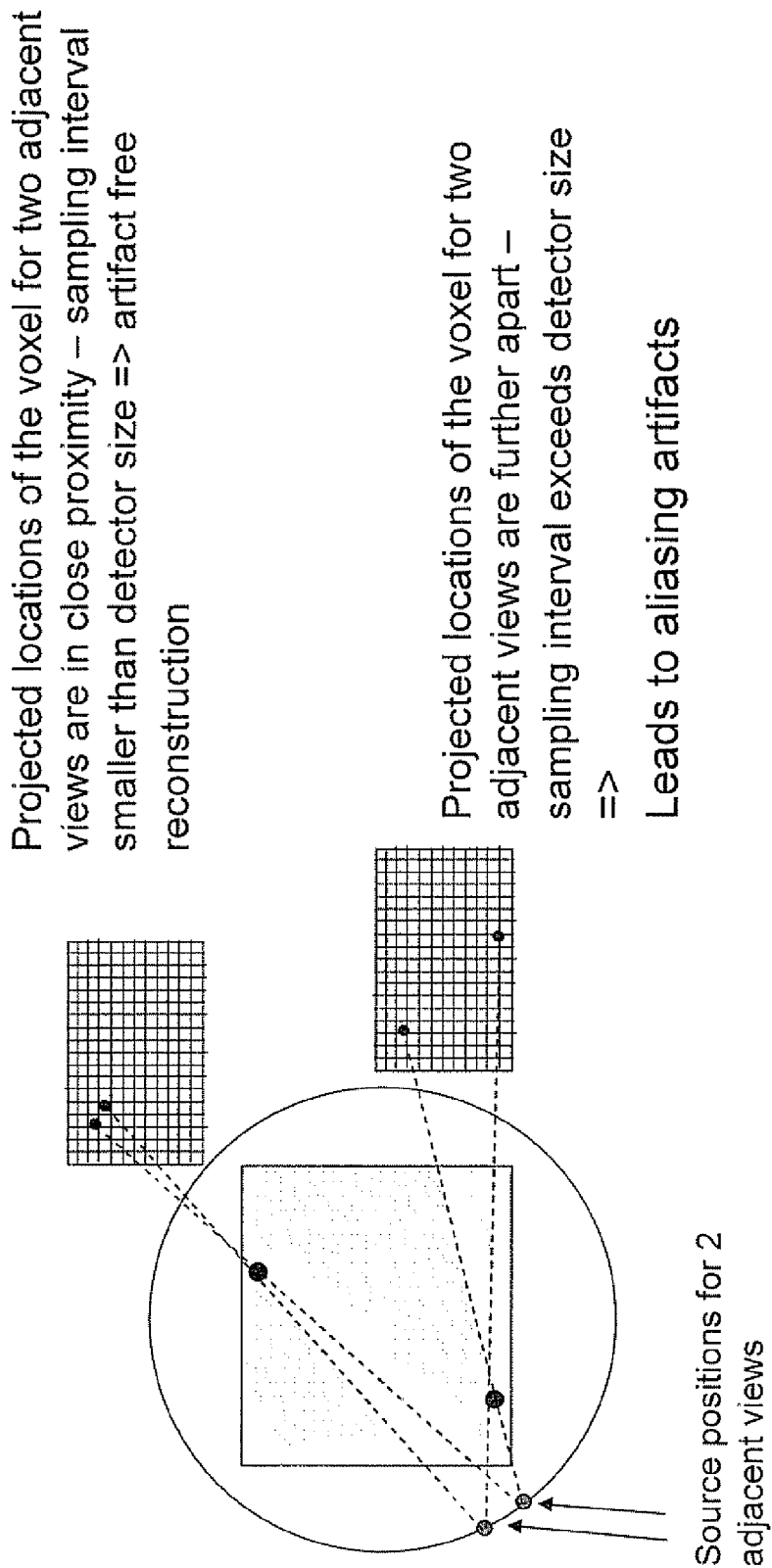
Figure 22:
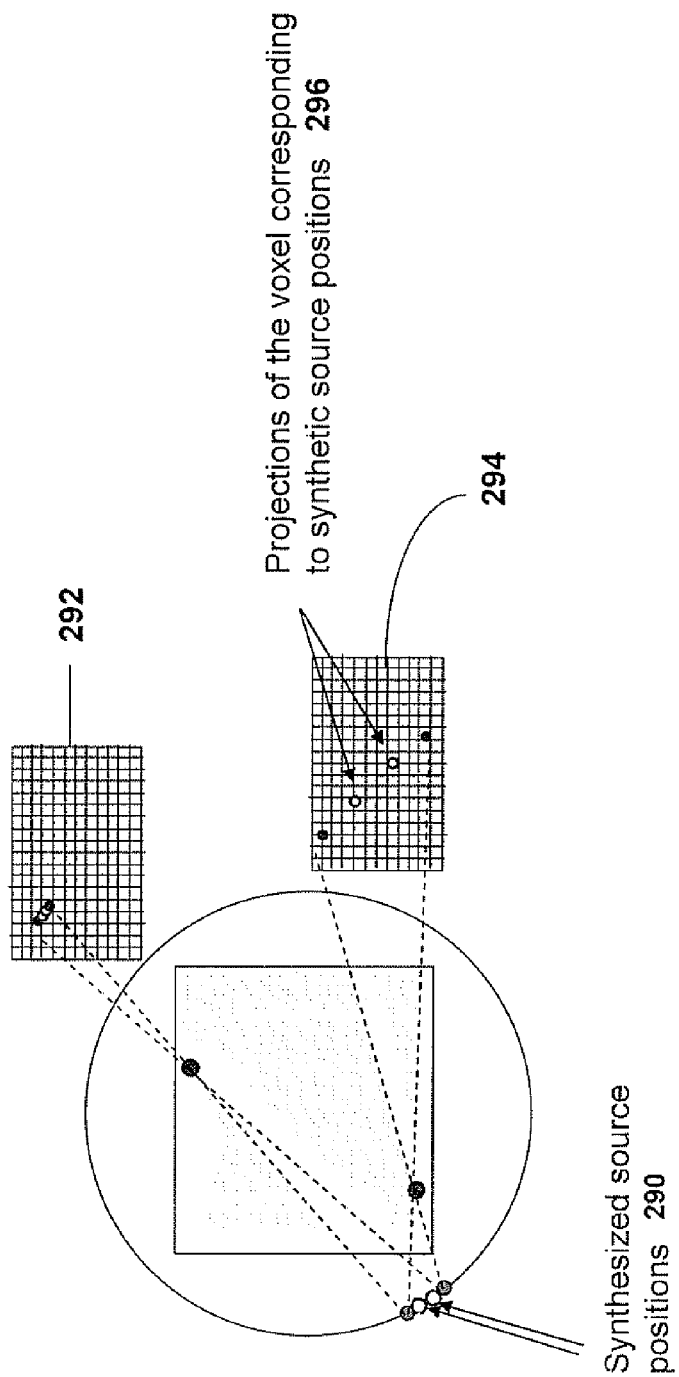
Figure 23:
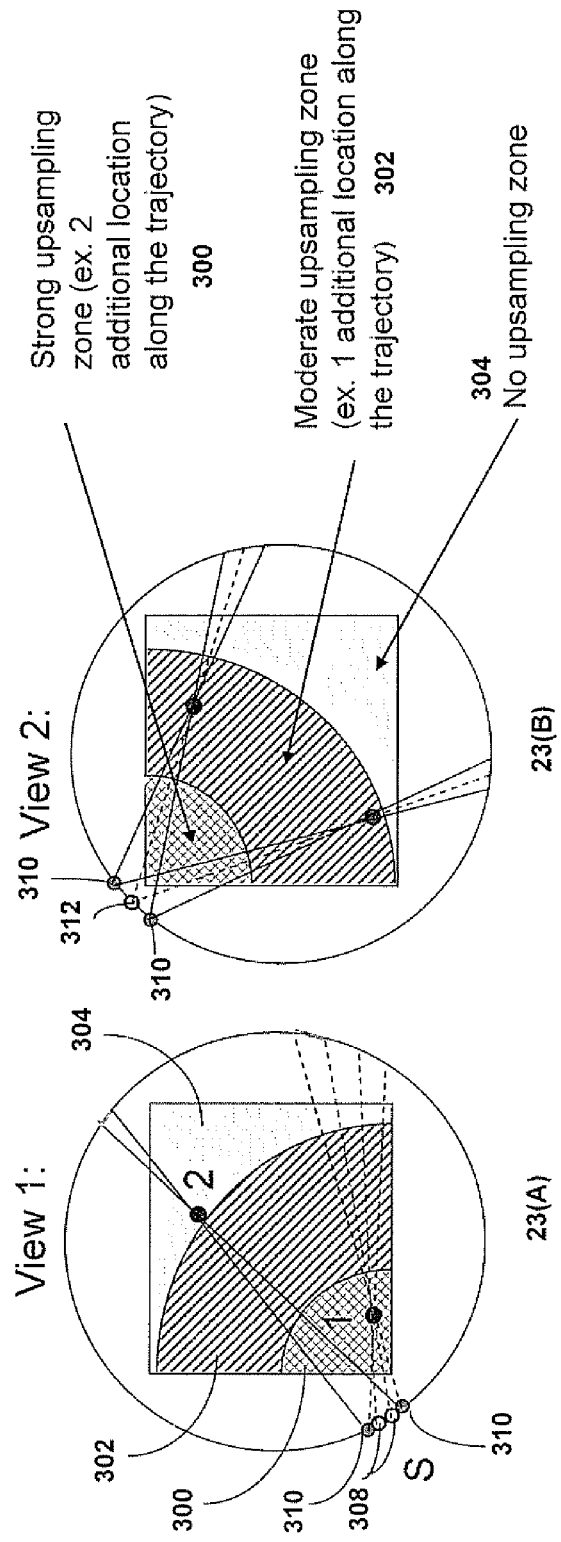
Figure 24A:
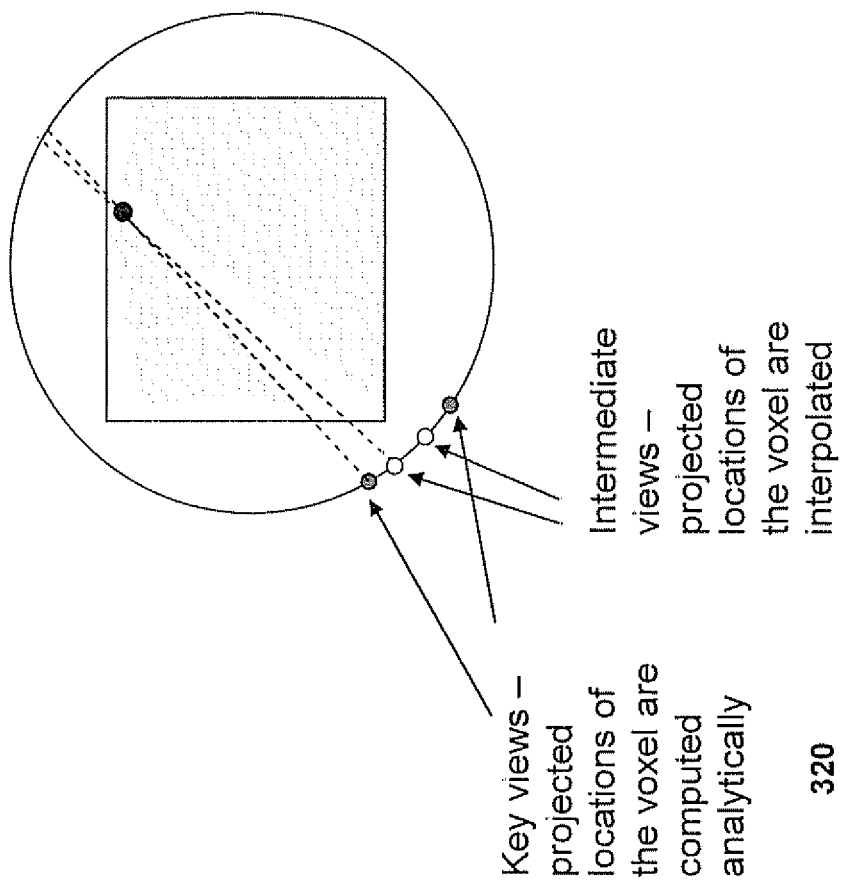
Figure 24B:
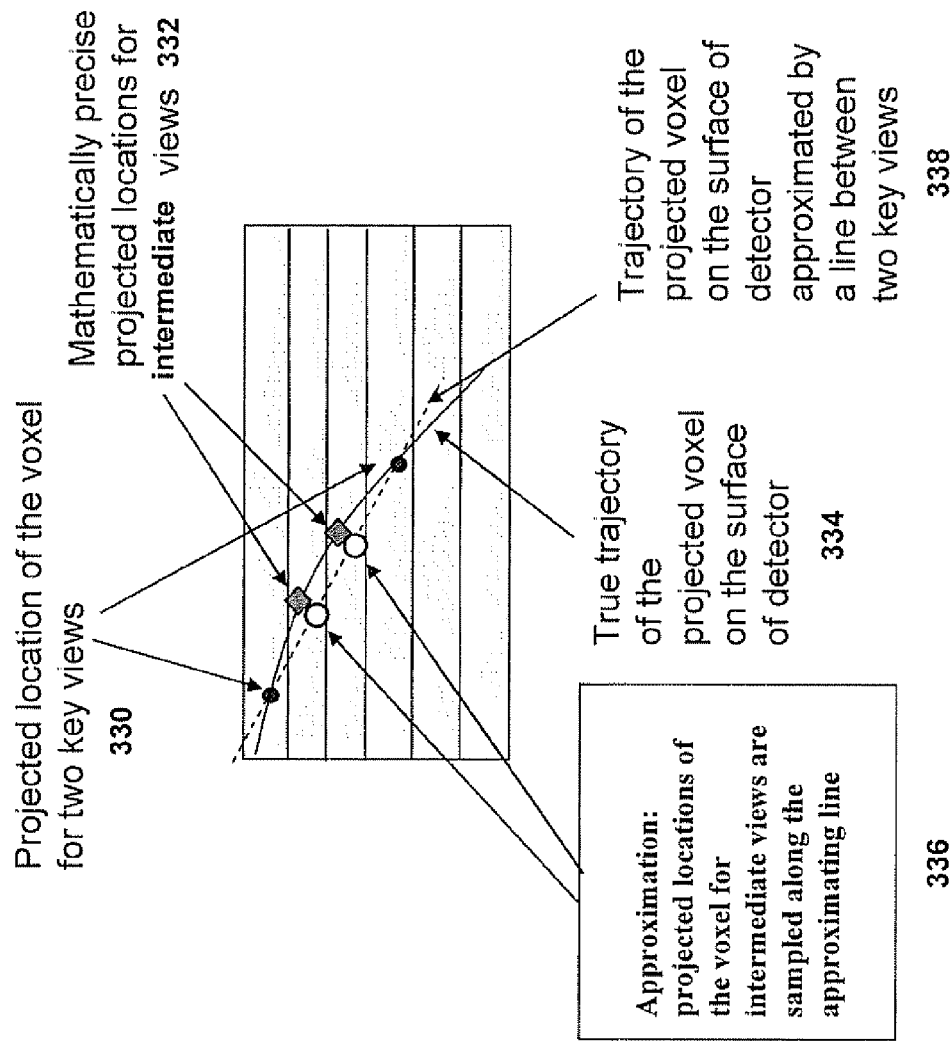

FIGS. 5(A) and 5(B) are simplified perspective views illustrating principles of 2D and 3D reconstruction techniques;

FIG. 6 is a simplified perspective view illustrating the application of the FDK process of creating image data from full rotation data;

FIG. 7 is a flow chart illustrating the basic steps of the FDK process;

FIGS. 8(A) and 8(B) are simplified illustrations showing the path of X-ray photons from the source to the detector array, and an example of a sampling region for a projection angle segment of $180°+2\gamma_m$;

FIG. 9 is a flow chart illustrating the steps of a basic helical FDK process;

FIG. 10 is a simplified perspective drawing illustrating the use of tangential filtering to reduce cone beam artifacts in data acquired from a flat detector array;

FIG. 11 is a flow chart showing the additional step utilized to provide tangential filtering as a part of a helical FDK process;

FIG. 12 is a simplified view showing the relative differences in the number of samples required to resample the data using conventional flat and cylindrical detector arrays from the data acquired by an array having an arbitrary beamline geometry;

FIG. 13 is a simplified perspective view showing how a scanner employing a non-flat detector array of an arbitrary beamline geometry can employ the helical FDK process by resampling data onto a virtual flat detector, according to the improvements described herein;

FIG. 14 is a flow chart illustrating the steps of the FDK process using additional improvements in a scanner of the type employing a non-flat detector array of an arbitrary beamline geometry;

FIG. 15(A) shows a reconstruction coordinate system (CS) including an axial gantry CS and a detector array in a cylindrical CS, while FIG. 15(B) shows detectors in a uw-plane of the detector cylindrical CS;

FIG. 16 is a schematic illustrating resampling data from a detector array of an arbitrary beamline geometry onto curved lines of a virtual cylindrical detector array corresponding to titled lines of a virtual flat detector array;

FIG. 17 is a graphical illustration of the filtering lines for an equiangular detector array visualized in cylindrical detector coordinates;

FIG. 18 is an illustration of an example of a reconstruction plane R, and helical source trajectory;

FIG. 19 is detector coordinates representation of a trajectory traced by a reconstruction point, illustrating the results of upsampling and sparse projection computation;

FIGS. 20(A) and 20(B) illustrate resampling approach on detector arrays respectively without and with row dithering;

FIG. 21 is a schematic view illustrating the problem of the increase in sampling interval of projected voxel locations with increasing distance from the center of the FOV;

FIG. 22 is a schematic view illustrating the technique of upsampling of the projection trajectory;

FIG. 23 is a schematic view illustrating an adaptive upsampling technique of reducing computation; and FIGS. 24(A) and 24(B) are schematic views illustrating a backprojection technique using sparse projections.

DETAILED DESCRIPTION OF THE DRAWINGS

Market considerations drive CT scanner design towards faster scanning speed while maintaining image quality. One way to gain higher speed helical CT acquisitions is to increase the coverage of the scanned object by increasing the number of detector rows. The drawback of increasing the number of detector rows is that the cone-angle of the detector array increases, causing more prominent cone-beam image artifacts. Therefore, one must utilize an appropriate 3D reconstruction process which can maintain cone-beam artifacts at an appropriate level as specified by the application.

Approximate 3D image reconstruction processes based on the FDK process are popular due to relative simplicity and robustness. Furthermore, the FDK process combined with enhancements proposed in the prior art, namely, tilted plane reconstruction and tangential filtering, can further reduce image artifacts compared with the standard FDK process.

Such an enhanced quasi-exact version of the helical FDK process is an attractive choice for the modern CT scanner. However, there exist at least three limitations that inhibit implementation of such a process on CT scanners.

First, FDK processes in the literature are designed for flat or cylindrical detector arrays. Moreover, the enhanced FDK process including tangential filtering is only designed for a flat detector array. If directly applied, such processes may not be applicable to modern CT scanning systems with unconventional beamline geometry. As used herein the terms "unconventional beamline geometry" and "arbitrary beamline geometry" each mean a beamline geometry in which the detector array represents a non-flat, non-cylindrical surface with possibly non-uniformly spaced detectors. Therefore, as described hereinafter, the data can be resampled into a flat or cylindrical detector geometry before reconstruction. The method described hereafter is designed to perform such resampling while keeping resampled detector size as small as possible and reducing computation without compromising image quality (IQ).

Secondly, FDK processes in the literature generate aliasing artifacts in scanners with large fields of view (FOV) due to the increase in sampling intervals of projected voxel locations on the detector array with increasing distance from the center of the FOV. In particular, for voxels close the X-ray source position in a given view, the sampling interval of projected voxel locations significantly exceeds the detector size, resulting in prominent aliasing artifacts.

Thirdly, computational complexity of 3D processes is significantly higher than that of 2D processes. Therefore, an efficient process and numerical implementation as well as a suitable hardware platform are required. In particular, processes and their numerical implementations must be aligned with reconstruction time requirements given the hardware platform.

The present disclosure describes a CT scanner and scanning technique that employs a novel quasi-exact process derived from FDK, which handles arbitrary beamline geometry, reduces artifacts in scanners with large FOVs, and improves image quality while simultaneously enabling an efficient accelerated implementation on hardware such as graphics processing units (GPUs).

Figure 1:
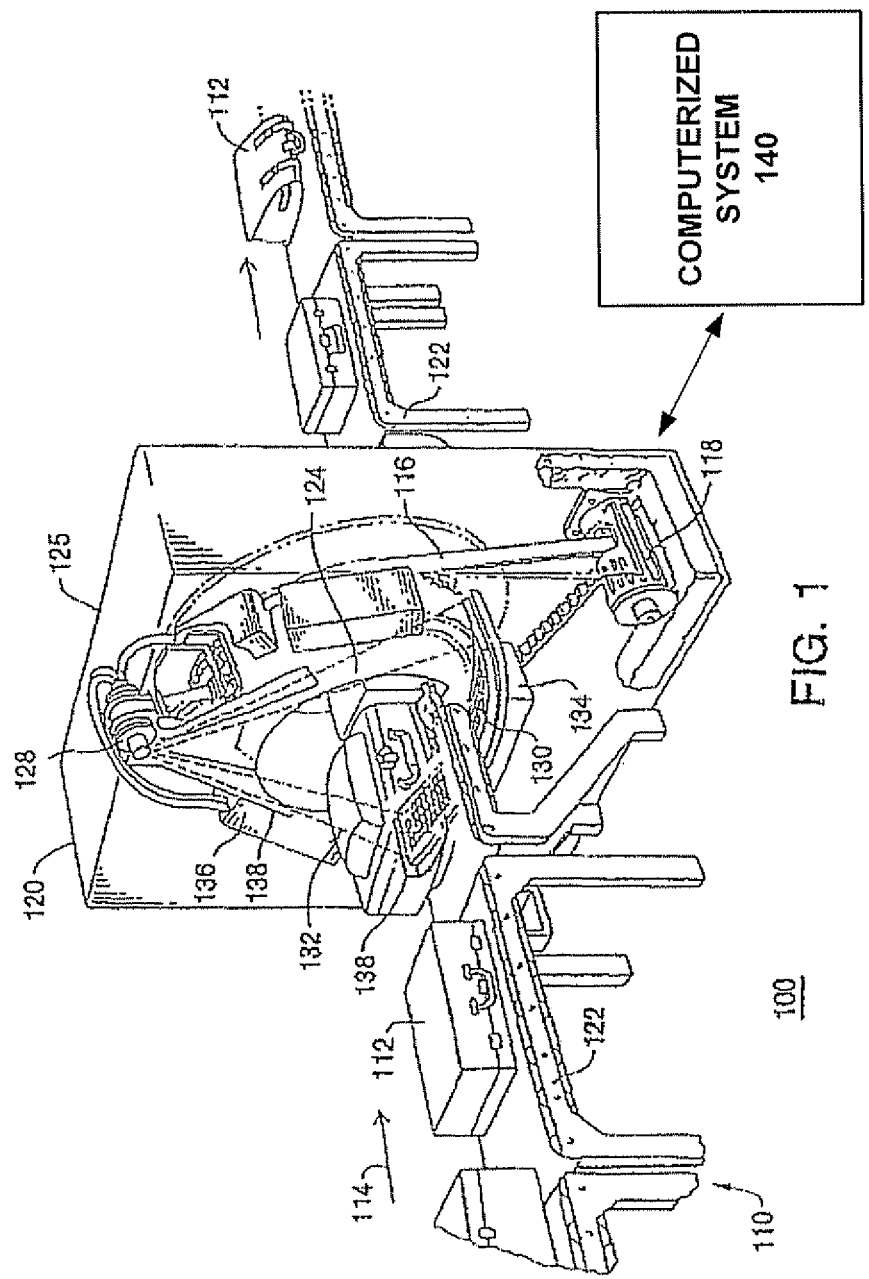
FIG. 1 is a perspective view of a baggage scanning system including the X-ray source and detector array mounted on the rotating gantry, which can be adapted to incorporate the system and perform method described herein.
Figure 2:
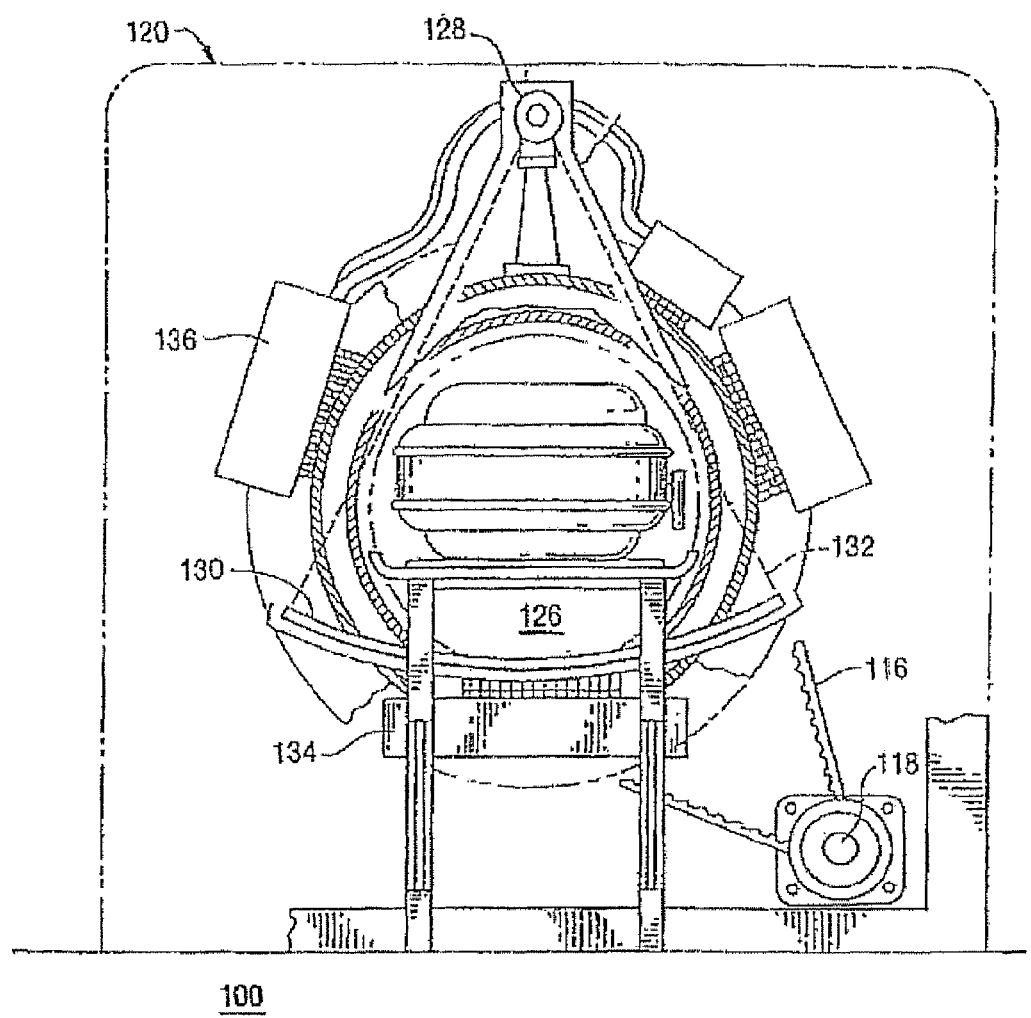
FIG. 2 is a cross-sectional end view of the system of FIG. 1.
Figure 3:
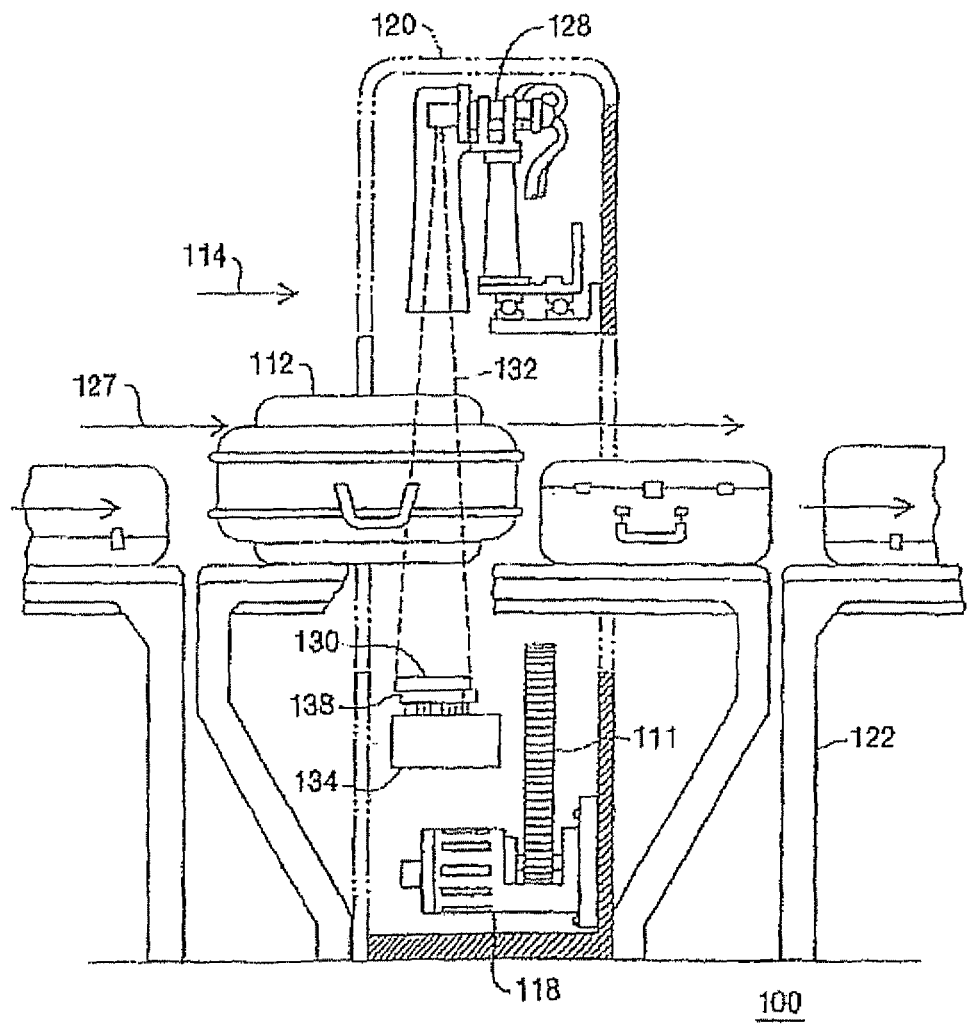
FIG. 3 is a cross-sectional radial view of the system of FIG. 1.

The improvements to CT scanning systems described herein are useful in any CT scanning system including medical scanners as well as baggage scanners. An embodiment of a typical baggage scanner is shown in FIGS. 1-3, but it should be understood that the illustrated scanner is but one embodiment which can incorporate one or more of these improvements. Referring to FIGS. 1, 2 and 3, the illustrated baggage scanning system indicated 100 includes a conveyor system 110 for continuously conveying baggage or luggage 112 in a direction indicated by arrow 114 through a central aperture of a CT scanning system 120 so that helical scans can be performed on the luggage. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism. Rotating platform 124 defines a central aperture 126 through which conveyor system 110 transports the baggage 112. The rotation axis defines the Z-axis of the scanning system, while the X and Y-axes (perpendicular to the Z-axis) are disposed in the center scanning plane (normal to the Z-axis).

The system 120 includes an X-ray tube 128 and a detector array 130 which are disposed on diametrically opposite sides of the platform 124. The detector array 130 is preferably a two-dimensional array of any arbitrary geometry, as will be explained more fully hereinafter. The system 120 further includes a data acquisition system (DAS) 134 for receiving and processing signals generated by detector array 130, and an X-ray tube control system 136 for supplying power to, and otherwise controlling the operation of X-ray tube 128. The system 120 is also preferably provided with a computerized system (shown in FIG. 1 at 140) for processing the output of the data acquisition system 134 and for generating the necessary signals for operating and controlling the system 120. The computerized system 140 can also include a monitor for displaying information including generated images. System 120 also includes shields 138, which may be fabricated from lead, for example, for preventing radiation from propagating beyond gantry 125.

The X-ray tube 128 includes at least one cathode and one anode for creating at least one separate focal spot from which an X-ray beam can be created and generated. The beam shown generally at 132 in FIGS. 1-3, passes through a three dimensional imaging field, through which conveying system 110 transports baggage 112. After passing through the baggage disposed in the imaging field, detector array 130 can receive each beam 132. The detector array then generates signals representative of the densities of exposed portions of baggage 112. The beams 132 therefore define a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles. The data acquisition system 134 includes a processor subsystem within system 140 for carrying out the data processing described herein.

Figure 4:
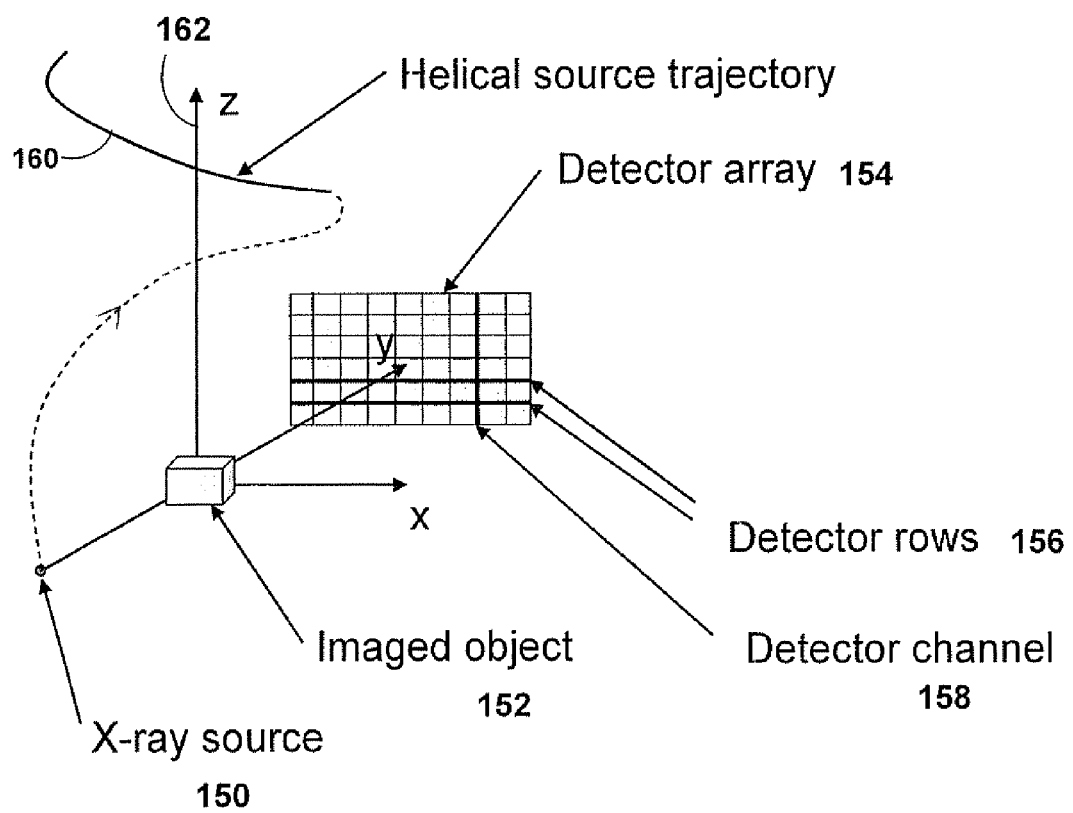
FIG. 4 is a simplified perspective view of helical scan geometry when a flat detector array is employed.

As shown in FIG. 4, the gantry can be represented in a coordinate system affixed to the imaged object 152. During a helical scan the beam from the X-ray source 150 is directed towards detector array 154 comprising rows of detectors 156. Each detector row 156 of the array 154 comprises detector channels 158. Intersection of a row and a channel defines one detector element (usually defined by the locus of the center of each detector). In the present representation, the x-ray source 150 traverses a helical trajectory 160 along the z-axis 162 relative to the imaged object 152 as shown.

As mentioned above, image reconstruction processes for helical CT scans can be classified into 2D and 3D processes. For a given cone angle, 3D processes produce fewer cone-beam artifacts when compared with the 2D processes. Relative image quality improvement achieved by 3D processes increases with scanner pitch and the number of detector rows.

A difference between 2D and 3D processes is illustrated in FIG. 5. As shown in FIG. 5(A) for 2D processes, approximated 1D parallel projections 164 for a plurality of tilted planes 166 are extracted, indicated at 168. In doing so, one set of approximated parallel projections is generated for all voxels in the given tilted plane. The parallel projection data are then filtered. The 2D back-projection process is then used to reconstruct an image on tilted planes using a set of 1D parallel data for a given tilted plane.

By contrast, 3D processes perform image reconstruction without conversion to intermediate 2D processes. One of the most widely used 3D image reconstruction processes is known as the Feldkamp Davis Kress (FDK) process. The FDK process is relatively easy to implement, stable, tractable, and is widely adopted by the industry. The FDK process includes filtering and 3D back-projection. First, the projection data are filtered along the detector rows. Second, 3D back-projection of the filtered data is performed. As shown in FIG. 5(B), in the 3D back-projection step, voxels 170 are individually and exactly projected directly in 3D space onto the detector array 172, filtered projection values from corresponding detector positions are accumulated to produce the density value for the reconstructed voxel 170.

Aspects of image reconstruction processes are further illustrated with respect to two types of scan modes: the helical scan mode, as described above and the axial scan mode, realized by stopping the belt movement. In the axial scan mode, the X-ray source moves along the circular trajectory around the imaged object.

Aspects of the original FDK process for an axial scan are illustrated in FIGS. 6 and 7. As shown in FIGS. 6 and 7, the FDK process can be summarized as follows: The full rotation data 176 are weighted at 178 to account for different path lengths for different rays. Filtering is performed on data acquired along detector rows at 180, and then the filtered data are back projected at 182 voxels to create the backprojected image 184. During the backprojection step, the reconstructed voxel is projected onto the detector array for each view. Filtered projections are interpolated to obtain values where the projected voxel position falls between detectors as indicated at 186 in FIG. 6. The interpolated filtered projection values are then accumulated.

Figure 8:
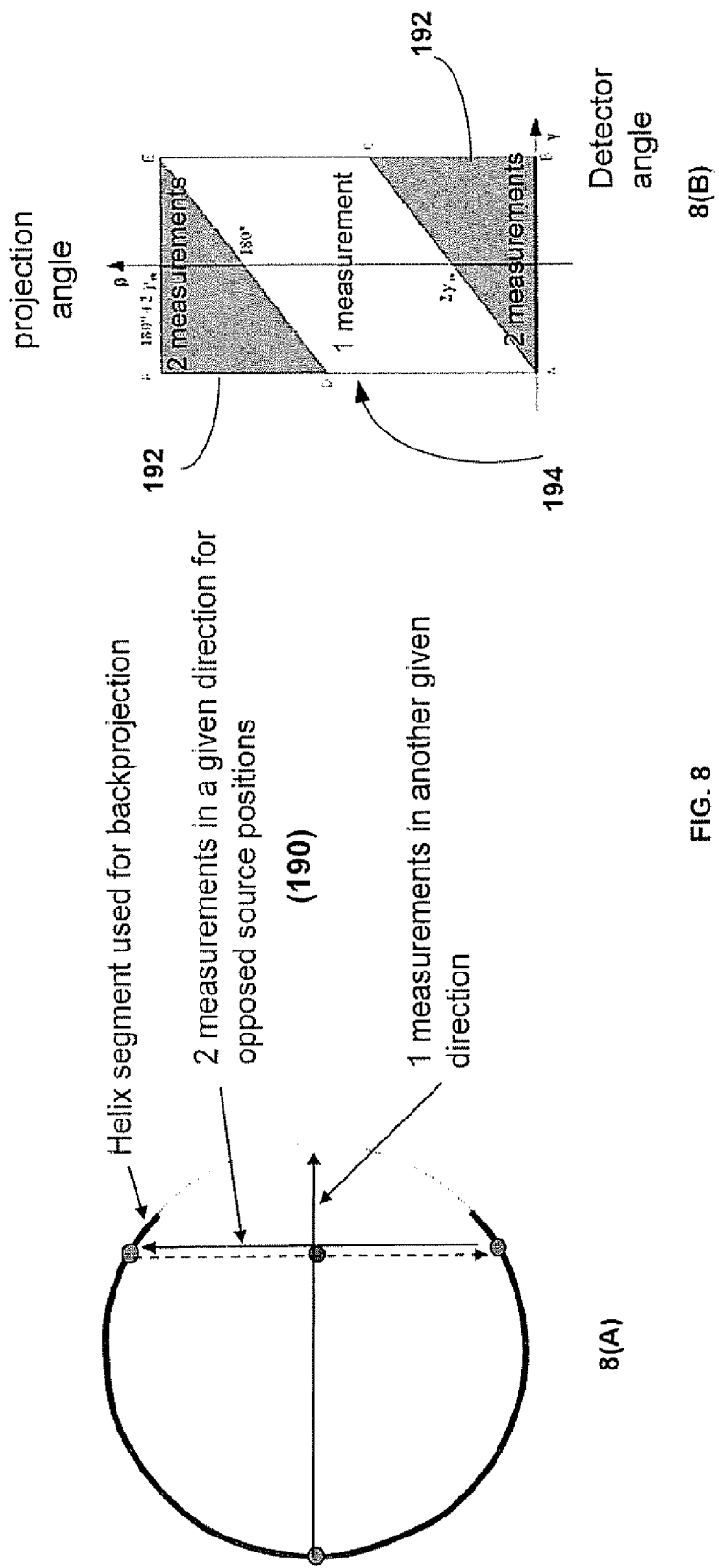

The original FDK process has gained popularity due to its stability and ease of implementation. Numerous extensions of the process have been proposed to adapt the process to different scanning geometries and to improve image quality. The extension of the FDK process to constant pitch helical scanning, illustrated in FIGS. 8 and 9, was first proposed by Wang et al. [Wang, G. Lin. T, Cheng, P. and Schiozaki, D. M., "A General Cone-Beam Reconstruction Algorithm", IEEE Trans. Med. Imaging, 12, 1993]. In the FDK process for the helical scan, in order to reconstruct a voxel, only $\pi+\gamma_m$ (wherein $\gamma_m$ is the detector array fan angle) worth of projection data (half-segment) is used, as illustrated in FIG. 8(A). The sampling region 194 of FIG. 8(B) for the half-segment set of data is represented in the space of detector angle and projection angle. If a given projection direction has two corresponding overlapping measurements (shown by way of example at 190 in FIG. 8(A), and in the shaded areas 192 in sampling region 194 of FIG. 8(B)), the data from rays projected in the two opposite directions must be weighted and summed to equalize contributions of all projection directions. Accordingly, as shown in FIG. 9 redundancy weighting was also introduced (shown at 196) prior to row filtering step 180 to take into account these redundant readings, which are weighted accordingly.

Enhancements of the helical FDK process to reduce artifacts were recently proposed, including tilted plane reconstruction, (see, for example, Yan, M. and Zhang, C., "Tilted Plane Feldkamp Type Reconstruction Algorithm for Spiral Cone Beam CT", Med. Phys. 32 (11), 2005), and tangential filtering (see, for example, Sourbelle, K., and Kalender, W. A., Generalization of Feldkamp reconstruction for Clinical Spiral Cone-Beam CT).

The tilted plane reconstruction enhancement is as follows. The FDK process results in an exact reconstruction for a given plane when the source trajectory segment that is utilized lies in the plane. However, a constant speed helical source trajectory segment is not contained in any one plane. Inconsistency between the actual out-of-plane source trajectory and the in-plane assumption used in FDK process generates cone-beam artifacts. It was shown that by selecting planes of voxels to be reconstructed using closely fitted segments of the source trajectory, associated artifacts can be reduced. The tilted plane reconstruction approach will be used herein.

Tangential filtering for flat detector arrays is generally illustrated in FIGS. 10 and 11. As shown in FIG. 11, half-segment data 202 acquired from a flat detector array 200 (shown in FIG. 10) is filtered along tilted lines as shown at 204 so as to reduce artifacts. The half segment data 202 acquired from the flat detector array 200 is weighted at step 206 of the FDK process, and filtered at step 210 along the lines aligned with the helical source trajectory, followed by redundant data weighting at 208. The data are then back-projected at 212.

As stated, there are challenges using the FDK process in a scanner employing a non-conventional detector array. The following challenges shall be addressed in order to adapt the FDK process to a scanning system with a non-conventional (non-flat) detector array, while achieving maximum image quality (IQ):

1. Use of the helical FDK process results in relatively high levels of cone-beam artifacts. Two key enhancements proposed in the literature greatly improve Image Quality. First, the tilted plane reconstruction approach described in Yan, M. and Zhang, C., "Tilted Plane Feldkamp Reconstruction Algorithm for Spiral Cone Beam CT", Med. Phys. 32 (11), 2005, reduces image artifacts by reducing the mathematical inconsistency between rays used to reconstruct a given voxel. Second, filtering data along tilted lines that follow the source trajectory (tangential filtering) [see, for example, Sourbell, K., and Kalender, W. A., Generalization of Feldkamp reconstruction for Clinical Spiral Cone-Beam CT] significantly reduces cone-beam artifacts. These process modifications must be implemented to reduce cone-beam artifacts.
2. FDK processes in the literature are usually designed for cylindrical detector arrays, which may not be applicable to modern CT scanners with unconventional (i.e., non-flat, non-cylindrical) beamline geometry. Moreover, tangential filtering approach was proposed only for flat detector geometry. Therefore, in order to use the FDK process with tangential filtering enhancement in conjunction with unconventional detector geometry, the data must be resampled into a suitable detector geometry before reconstruction. This operation is performed while keeping resampled detector size as small as possible and reducing computation without compromising IQ.
3. FDK processes in the literature generate aliasing artifacts in scanners with large fields of view (FOV) due to the increase in sampling interval of voxel locations projected on the detector array with increasing distanced from the center of the FOV.
4. Computational complexity of the process is significantly higher than that of 2D processes. Therefore, an efficient process and numerical implementation is required. In particular, processes and their numerical implementations must be aligned with reconstruction time requirements given the hardware platform.

As previously noted scanners do not always include detector arrays that are made from one of two conventional geometries, i.e, flat and cylindrical, and in fact can physically be made in any one of a variety of shapes, particularly scanners used in security applications. In accordance with the teachings described herein, as shown as an exemplary embodiment in FIG. 12, where the scanner employs a detector array of arbitrary geometry, defined as having a detector array where data samples are not all equiangularly or equidistantly spaced, resampling is taken at equiangular or equidistant positions, using for example a virtual array of one of two types of conventional geometry: flat detector arrays and cylindrical detector arrays. As mentioned, since most methods of acquiring and processing CT data assume that the detector array is either flat or cylindrical, as taught herein data acquired by a detector system of any arbitrary geometry can be processed and treated as though acquired with a flat detector array or a cylindrical detector array (resampled onto a virtual flat detector array or virtual cylindrical array), whereupon conventional processes can then be used to process the new data (see FIG. 16).

According to one embodiment of a CT scanning system incorporating features which address these issues is described hereinafter. As shown in FIGS. 12 and 13, the actual detector array 220 can have any arbitrary non-flat geometry. As described in more detail hereinafter, the data acquired by the array 220 will be resampled at equiangular or equidistant spacings, as for example on a virtual flat detector array, or onto a virtual cylindrical detector array 226, in order to enable subsequent filtering step and to reduce artifacts. As an example for virtual flat detector case, as shown in FIG. 13, the data can be resampled onto tilted lines as shown at 228.

In one embodiment, the CT scanner employing the detector array with an arbitrary geometry is configured to carry out the exemplary steps of the process illustrated by the flow diagram of FIG. 14. The illustrated process receives half-segment data 232 and processes the data including the following steps: equiangular resampling with row dithering 234, fan-beam and cone-beam weighting 236, redundancy weighting 238, tangential filtering 240, adaptive upsampling 242, backprojection with sparse computation 244, and if necessary, as an added step Z-axis interpolation of the backprojected voxels 246.

At the Equiangular resampling with row dithering step 234 of FIG. 14, the detector data is resampled onto a virtual detector array (array 224 in FIG. 13). In order to employ the tangential filtering approach to reduce artifacts, and in order to perform space invariant filtering using FFTs, the detector data acquired with arbitrary detector geometry must be filtered along tilted along lines such as shown at 228. In accordance with the teachings herein, this filtering can be realized by resampling the data onto the tilted lines on a virtual flat detector array, such as shown at 224 (so as to provide equispatial samples). Alternatively, the data can be resampled onto curves in the virtual cylindrical detector array, which project onto required lines in the virtual flat detector, (so as to provide equiangular samples) all as shown by way of example in FIG. 16. As shown in FIG. 12, in order to cover the same angle, at the same time achieving equivalent sampling rate at the isocenter, equiangular resampling (onto virtual cylindrical array) requires less samples, which enables reducing computational cost. As a result, the process is adapted for arbitrary beamline geometry, and required resolution is achieved with a minimum number of detector elements, while reducing computational cost.

Simultaneously, row dithering is used during step 234 (shown in FIG. 14). As shown in greater detail in FIG. 20, row dithering includes a shift in positions of the resampled detector rows for different views. As a result, resampled detectors for different detector angles have different bandwidths for different views, but on average have approximately the same effective bandwidth. Hence, resampled detectors do not exhibit bandwidth dependency upon the detector angle and the artifacts are eliminated. More specifically, the detector sampling points using row dithering shown in FIG. 20(B) are compared to the sampling points of a prior art approach with no row dithering as shown in FIG. 20(A). The dithering approach in FIG. 20(B) is illustrated for simplicity using 2 views. For the second view, the detector rows are shifted by half of the row width. In the FIG. 20, the centers of the detectors are indicated by the intersection of the horizontal and vertical lines overlaid on the detector array. As shown in FIG. 20(A) high bandwidth is achieved where the sampling point lies at the center of a detector (such as detector 3 in FIG. 20(A)). However, data for detector 4 must be interpolated resulting in low bandwidth. As seen the relative position of the detector rows and resampled curves is the same of all views. Each detector channel has a fixed bandwidth for all views, resulting in artifacts that add in phase during backprojection. Using row dithering however, the relative position of detector rows and the resampled curve varies across the views. A specific detector channel may have a different bandwidth in the different views. On a view average, all detectors have a similar bandwidth. In backprojection, multiple views contribute to the reconstruction. Therefore, effective bandwidth of a specific channel is an average over many views, same for all detector channels. Artifacts are reduced by equalizing bandwidth across detectors. In practice, a random or deterministic strategy can be used to select a sequence of shift values for different rows.

Referring again to FIG. 14, at the Fan-beam Cone-beam Weighting step 236, the resampled detector data is weighted using a fan-beam and cone-beam weighting scheme, such as the one described in Wang, G. Lin, T., Cheng, P. and Schiozaki, D. M., "A General Cone-Beam Reconstruction Process", IEEE Trans. Med. Imaging, 12, 1993.

At the Redundancy weighting step 238 of FIG. 14, the resampled and cone-beam weighted data is weighted to compensate for presence of redundant rays. For a given half-scan segment and a given reconstruction voxel, one or two rays (with source position on the opposite sides) can pass through the voxel in a given direction. When two rays pass through the given voxel in opposite directions, these two rays are called complementary rays. Complementary rays produce redundant data, which must be weighted and summed, to ensure that backprojection contributions from opposite sides of the segment transition smoothly into one another. A weighting scheme, such as described in Parker, D. L., "Optimal Short Scan Convolution Reconstruction for Fan-Beam CT", Med. Phys. 9(2), 1982, can be used to weight complementary data. Redundancy weighting for each projection is repeated for each reconstruction plane.

At the Tangential Filtering step 240 of FIG. 14, the weighted data is filtered along the rows of the resampled detector array. Since the data in each resampled row is sampled along the tilted line, resulting filtering is equivalent to the tangential filtering approach in Sourbelle, K., and Kalender, W. A., Generalization of Feldkamp reconstruction for Clinical Spiral Cone-Beam CT. Using filtered data obtained using this approach in 3D back-projection minimizes cone-beam artifacts.

At the back-projection step 244 of FIG. 14, the 3D image is reconstructed by back-projecting the filtered data. Back-projection is carried out by projecting each voxel onto the resampled detector for each view in the half-segment while accumulating interpolated filtered projection values. For large fields of view (FOVs) the back-projection step results in aliasing artifacts that vary with location in the image. This is due to the fact that view angle interval between adjacent views strongly depends upon relative position of the reconstructed voxel and the X-ray source. Image locations close to the source show the largest aliasing artifacts (see FIG. 21).

At the Adaptive upsampling step 242 of FIG. 14, aliasing artifacts are corrected. In accordance with the teachings described herein, the aliasing artifacts can be reduced by upsampling the voxel trajectory projected onto the detector. For example, as shown in FIG. 22, synthetic source positions 290 are created between each of two data views 292 and 294. The trajectory of the point projected onto the detector array is effectively upsampled. As shown at 296, the projection locations of the voxel corresponding to synthetic source positions are therefore generated. The backprojection sum is augmented with interpolated filtered projection values sampled at locations corresponding to synthetic source positions. The adaptive upsampling step 242 can be understood as performing filtering of the projections along the lines traced on the detector array surface by each reconstructed volume element, substantially eliminating aliasing artifacts.

Furthermore, computation burden of the adaptive upsampling step can be reduced by adapting the upsampling frequency to image location as required to achieve optimal image quality. FIG. 23 shows an example of adapting upsampling frequency as a function of image locations for large FOVs.

Three concentric zones for two different views are shown in FIG. 23 by way of example, with zone 300 being closest to the source, zone 302 being of intermediate distance, and zone 304 farthest from the source. Voxels will fall into different zones for different views. For this type of arrangement the closest zone 300 will be the strong upsampling zone, for example, two additional locations 308 being provided between each location 310 (see FIG. 23(A)), while the intermediate zone 302 will be a moderate upsampling zone, for example, one additional location 312 being provided between each location 310 (see FIG. 23(B)), and zone 304 will be the no upsampling zone in which no additional locations are provided. Zones are thus rotated with the source S. A given voxel falls into different zones for different views. For any voxel, for any view, the resulting sampling interval is approximately the same. Zones with different upsampling are blended into one another in order to avoid discontinuities in the image.

Referring again to FIG. 14, at the Backprojection with Sparse Computation step 244, filtered projection data are backprojected onto the reconstructed image locations. An output driven process is utilized to reconstruct density values on tilted planes. In order to reduce computation expense, a sparse computation approach can be implemented. Under this approach, projected locations for each voxel are computed exactly only for a set of equidistant key views. Projected locations for intermediate views are computed by interpolation from adjacent key views. FIG. 24 illustrates a simplified example of this backprojection step. The most computationally expensive part of back-projection is computing projected locations of voxels on the detector array. In accordance with the teaching herein, the projected locations are computed analytically only for key views. For example, the key views can be selected equispaced. Projected locations for intermediate views are determined by interpolation so that image quality is preserved.

More specifically, as shown in FIG. 24(A), for key views 320, the projected locations of the voxel are computed exactly. For intermediate views 322, the projected locations of the voxel are interpolated. In FIG. 24(B), the mathematically precise projected locations for intermediate views are shown at 332 along the true trajectory 334 of the projected voxel on the surface of the detector array. The locations 336 for the intermediate views are sampled along the approximating line 338, connecting projected locations for adjacent key views, shown at 330.

Finally as noted above and shown in FIG. 14, if necessary, an added step Z-axis interpolation of the image data 246 is performed.

Herein, the embodiment of the method is presented using cylindrical virtual detector resampling approach.

Reference is made to FIGS. 15(A) and 15(B), wherein the Coordinate System (CS) is shown, and the following definitions are used.

| Name | Notation | Description |
| --- | --- | --- |
| Reconstruction CS | (x, y, z) | The right-handed Cartesian reference frame. The X-ray source is moving in the direction of positive z. Source rotates counterclockwise when viewed from the positive z. View angle β is measured with respect to x-axis. Detector 0 is at the trailing edge of the array. Row 0 is at the negative z side of the detector array. |
| Axial gantry CS | (t, s, p) | Right-handed Cartesian coordinate system with origin at the intersection of scanner rotation axis and the line connecting the source and the detector array center. The s-axis points towards the source. |
| Detector cylindrical CS | (u, v, w) | Right-handed Cartesian coordinate system with origin at the detector array center. The uv-plane is orthogonal to the line connecting the source and detector array center. The v-axis is parallel to the the cylinder axis of the detector array. w-axis points towards the source. |

For the type of scanning system shown in FIGS. 1-3, the transform between the axial gantry CS and the reconstruction CS is:

$$s = x \cos \beta + y \sin \beta$$

$$t = -x \sin \beta + y \cos \beta$$

$$p = z - S_{belt}(\beta/2\pi) \quad (1)$$

where β is the view angle and $S_{belt}$ is the distance traveled by the belt in one rotation of the rotatable disk.

The transform between the axial gantry CS and a cylindrical CS of a detector array is:

$$U = t \cos \psi + p \sin \psi$$

$$v = t \sin \psi + p \cos \psi$$

$$w = s + (R_{sd} - R_{sc})$$

where ψ is the detector array tilt angle, given by the scanner design. The detector array tilt angle is the angle between the v-axis and the z-axis (detector is rotated around the s-axis of the axial gantry CS). $R_{sd}$ and $R_{sc}$ are source-to-detector and source-to-center distances respectively, given by the scanner design.

Referring to FIG. 15(A) and FIG. 15(B), detector channel coordinates in the uw-plane are given by the detector design. Detector channel u and w coordinates for the channel i are denoted u[i] and w[i] respectively. Detector angles γ[i] for each channel i∈[1 . . . $N_{det\_DAS}$] are pre-computed and supplied to perform the operation of the scanner.

The method is initialized by two preparation steps: (a) reconstruction geometry setup and (b) view segment selection. The reconstruction geometry setup step constructs the reconstruction image grid and computes the necessary parameters. The View segment selection step associates data view segments with reconstruction locations.

The setup of reconstruction geometry includes specifying the reconstruction grid, resampled detector parameters, reconstruction planes, and other parameters utilized in subsequent steps of the method.

One embodiment of the method includes the following:

Image reconstruction grid is computed using image size parameters $N_x$, $N_y$, and $N_z$, in a plane voxel size $d_{pix}$, image center coordinates $x_0$, $y_0$, and slice spacing $d_z$. A set of reconstructed image voxels indices Ω is selected as follows:

$$\Omega = \{\forall (\hat{i},\hat{j},\hat{k}) | 0 \leq \hat{i} < N_x, 0 \leq \hat{j} < N_y, 0 \leq \hat{k} < N_x\} \quad (3)$$

where coordinates (x,y,z) for a voxel $(\hat{i},\hat{j},\hat{k})$ are computed as follows $$x[\hat{i},\hat{j},\hat{k}] = (\hat{i} - N_x/2) d_{pix} + x_0$$

$$y[\hat{i},\hat{j},\hat{k}] = -(\hat{j} - N_y/2) d_{pix} + y_0$$

$$z[\hat{i},\hat{j},\hat{k}] = \hat{k} d_x \quad (4)$$

Detector elevation angles are computed. Consider a virtual cylindrical detector array such as shown in FIG. 16. The elevation angle is defined for a given detector as the angle between the ray intersecting the detector and the plane containing the central row. For the row j and detector channel i, the elevation angle is denoted as ξ(j,i). The elevation angle for each detector (row j, channel i) is precomputed as follows:

(a) Detector elevation above the central row plane is computed as $$z_{el}[j] = (j - r_{cen}) h_d \quad (5)$$

Wherein $r_{cen}$ is the center detector row and $h_d$ is the detector row height, given by the scanner design.

(b) Elevation angle is computed as $$\xi(j, i) = \text{asin}\left(\frac{z_{el}[i]}{\sqrt{(R_{sd} - w[i])^2 + u[i]^2 + z_{el}[i]^2}}\right) \quad (6)$$

As illustrated in FIG. 16, resampled detector positions are defined. The virtual flat detector plane P is defined as parallel to the tp-plane of the axial gantry CS, crossing the s-axis at $s = R_{sc} - R_{sd}$. In accordance with one embodiment, virtual filtering lines are defined in the virtual detector plane P. Virtual filtering lines are parallel and form filtering line angle, denoted as Θ, with t-axis. The angle Θ is equal to the tangent of the source trajectory:

$$\Theta = \text{atan}\left(\frac{S_{belt}}{2\pi R_{sc}}\right) \quad (7)$$

Therefore, virtual filtering lines are optimal filtering lines required for tangential filtering.

Filtering line positions along the p-axis depend on the view index. For the global view counter value m∈[1 . . . $N_V$], $N_{row}^{flat}$ tilted filtering lines is introduced in the virtual flat detector plane P, parameterized by displacements $b_j^m$, $j \in [1 \ldots N_{row}^{filt}]$. For $j^{th}$ filtered line, displacement $b_j^m$ is the p-coordinate of the line at t=0 (the intersection of the line with the at detector p-axis). $b_j^m$ is defined as follows:

$$b_j^m = h_d^{filt}\left(j - \frac{N_{row}^{filt}}{2} - d_{rand}(m \bmod N_{loop})\right) \quad (8)$$

Wherein:
$h_d^{filt}$ is resampled detector height or the interval between filtering lines; and
$d_{rand}$ (m mod $N_{loop}$)$\in [0 \ldots 1]$ is the constant displacement for all filtering lines for the view m.

As described above, displacements for different views are defined by wrapping around a random sequence $d_{rand}(k)$, $k \in [1 \ldots N_{loop}]$, supplied to the process. According to the teachings herein, random shift of the rows is an exemplary embodiment of the row dithering step.

Each filtering line in the virtual detector plane P forms a row of the resampled detector. We define $N_c^{filt}$ channels for one row of the resampled detector. Detector channel angle $\gamma_i^{filt}$ of the channel i is given by:

$$\gamma_i^{filt} = \frac{w_d^{filt}(i - s_{cen}^{filt})}{R_{sd}} \quad (9)$$

wherein
$w_d^{filt}$ is the channel width in the resampled detector; and
$s_{cen}^{filt}$ center detector in the resampled detector.

Therefore, the resampled detectors are equiangular in the detector channels.

For each detector channel in each filtering line in the virtual detector plane P the corresponding row coordinate in the detector array coordinate system is computed. The row coordinate of the projection of the $j^{th}$ filtering line onto the detector array, as a function of detector angle $\gamma_i^{filt}$ for the channel i is given by:

$$r_j^m(i) = \frac{(\psi - \tan\Theta)\sin\gamma_i^{filt} R_{sd} + b_j^m \cos\gamma_i^{filt}}{h_d} + r_{cen} \quad (10)$$

Filtering lines computed using Eq. 10 are shown in FIG. 17 in detector coordinate system (detector angle $\gamma$ and row r). In one embodiment, filtering lines computed using Eq. 10 are the tilted lines defined per equiangular resampling step with row dithering.

Center detector for resampled detector $s_{cen}^{filt}$ is computed as follows:

$$s_{cen}^{filt} = \frac{N_c}{2} \quad (11)$$

The half-fan angle $\delta$ is computed as follows:

$$\delta = \frac{s_{cen} w_d}{R_{sd}} \quad (12)$$

Reconstruction planes with corresponding helical source trajectory segments are defined. Each reconstruction plane is defined by the center view of the associated helical trajectory segment. For each center view, the source lies in the corresponding reconstruction plane. The reconstruction plane approximately fits the helical source trajectory over the segment of $2N_{HS}$ views.

In one embodiment, the center views and corresponding reconstruction planes are defined as follows:

1. Center views are selected with a view spacing of $N_{v\_index}$ views. The view index $k_m$ of the center view m is given by $$k_m = m N_{v\_index} \quad (13)$$

The view angle corresponding to m, $\beta[k_m]$ is given by $$\beta[k_m] = \frac{k_m 2\pi}{N_{rot}} + \beta_0 \quad (14)$$

2. Reconstruction plane tilt angle $\gamma_p$ (angle between tilted reconstruction plane and axial plane) is computed. $\gamma_p$ defines two locations of the reconstruction plane intersection with the helical source trajectory, symmetric with respect to view $v_m$, as illustrated in FIG. 18. The angle $\gamma_p$ is computed as follows $$\gamma_p = \mathrm{atan}\left(\frac{\alpha S_{belt}}{4 R_{sc}}\right) \quad (15)$$

where $\alpha$ is the reconstruction plane tilt factor defining the angular locations at which the plane intersects the helical source trajectory. When $\alpha=1$, the angular locations at which the plane intersects the helical source trajectory are $\pi/2$ apart.

3. The reconstruction plane $R_m$ for each center view m is defined as follows.
    (a) The plane contains the source location $\overline{P_m}$ corresponding to the view $k_m$, given by $$\overline{P_m} = \left\{R_{sc}\sin\beta[k_m], R_{sc}\cos\beta[k_m], \frac{S_{belt}}{N_{rot}}k_m\right\} \quad (16)$$

(b) The plane normal vector $\overline{n_m}$ is given by $$\overline{n_m} = \{n_m^x, n_m^y, n_m^z\} = \{\cos\beta[k_m]\sin\gamma_p, \sin\beta[k_m]\sin\gamma_p, \cos\gamma_p\} \quad (17)$$

where $\gamma_p$ is the reconstruction plane tilt angle computed in Eq. 15.

The reconstruction plane $R_i$ is illustrated in FIG. 18.

4. For each center view m, set of reconstructed image voxels indices $\Omega_m$ is selected as follows:

$$\Omega = \{\forall(\hat{i},\hat{j}) | 0 \le \hat{i} < N_x, 0 \le \hat{j} < N_y\} \quad (18)$$

where coordinates (x,y,z) for a voxel $(\hat{i},\hat{j})$ are computed as follows:

$$x[\hat{i},\hat{j}] = (\hat{i} - N_x/2)d_{pix} + x_0$$

$$y[\hat{i},\hat{j}] = -(\hat{j} - N_y/2)d_{pix} + y_0$$

$$z[\hat{i},\hat{j}] = S_{belt}\beta[k_m] - (\cos\beta[k_m]x[\hat{i},\hat{j}] + \sin\beta[k_m]y[\hat{i},\hat{j}])\tan\theta \quad (19)$$

The set of voxels defined by Eq. 19 defines the set of xy-grid voxels projected along the z-axis onto the tilted plane corresponding to the center view m.

In accordance with one embodiment, equiangular resampling with row dithering is employed, as illustrated in FIG. 20(B). The exemplary steps associated with equiangular resampling are as follows:

1. For each view m, filtering line $j \in [1 \ldots N_{row}^{filt}]$, and detector channel $i \in [1 \ldots N_c]$, elevation angle $\xi$ is computed as $$\xi = \operatorname{atan}\left(\frac{(r_j^m(i) - r_{cen})h_d^{flat}}{R_{sd}}\right) \quad (20)$$

where row coordinate $r_j^m(i)$ is computed using Eq. 10. Detector angle $\gamma_i^{filt}$, computed using Eq. 9 is denoted as $\gamma$ $$\gamma = \gamma_i^{filt} \quad (21)$$

2. Real valued detector channel index c corresponding to the angle $\gamma$ is obtained using linear interpolation from the given set of detector angles $\gamma[i]$, $i \in [1 \ldots N_{det\_DAS}]$ as follows:

(a) The integer index of the adjacent detector channel on the left side is found as $$c_{int} = \begin{cases} 0 & \text{if } \gamma \leq \gamma[0] \\ N_{det\_DAS} - 2 & \text{if } \gamma \geq \gamma[N_{det\_DAS} - 1] \\ \operatorname*{argmax}_{i}(\gamma[i] \leq \gamma) & \text{if otherwise} \end{cases} \quad (22)$$

(b) Real valued detector index c is found by linear interpolation from indices of the adjacent detectors:

$$w = \frac{\gamma - \gamma(c_{int})}{\gamma(c_{int}+1) - \gamma(c_{int})} \quad (23)$$

$$c = \begin{cases} 0 & \text{if } \gamma \leq \gamma[0] \\ N_{det\_DAS} - 1 & \text{if } \gamma \geq \gamma[N_{det\_DAS} - 1] \\ c_{int}(1-w) + (c_{int}+1)w & \text{if otherwise} \end{cases} \quad (24)$$

3. Real valued detector row values $r^-$ and $r^+$ for detector channels $c_{int}$ and $c_{int}+1$ respectively are computed as follows:

(a) The integer index $r_{int}^-$ of the adjacent detector row on for detector channel $c_{int}$ is found as $$r_{int}^- = \begin{cases} 0 & \text{if } \xi \leq \xi(0, c_{int}) \\ N_{row} - 2 & \text{if } \xi \geq \xi(N_{row}-1, c_{int}) \\ \operatorname*{argmax}_{j}(\xi(j, c_{int}) \leq \xi) & \text{if otherwise} \end{cases} \quad (25)$$

(b) Real valued row index $r^-$ is found by linear interpolation from indices of the adjacent detectors rows:

$$w = \frac{\xi - \xi(r_{int}^-, c_{int})}{\xi(r_{int}^-+1, c_{int}) - \xi(r_{int}^-, c_{int})} \quad (26)$$

$$r^- = \begin{cases} 0 & \text{if } \xi \leq \xi(0, c_{int}) \\ N_{row} - 1 & \text{if } \xi \geq \xi(N_{row}-1, c_{int}) \\ r_{int}^-(1-w) + (r_{int}^-+1)w & \text{if otherwise} \end{cases} \quad (27)$$

(c) The integer index $r_{int}^+$ of the adjacent detector row on for detector channel $c_{int}+1$ is found as $$r_{int}^+ = \begin{cases} 0 & \text{if } \xi \leq \xi(0, c_{int}+1) \\ N_{row} - 2 & \text{if } \xi \geq \xi(N_{row}-1, c_{int}+1) \\ \operatorname*{argmax}_{j}(\xi(j, c_{int}+1) \leq \xi) & \text{if otherwise} \end{cases} \quad (28)$$

(d) Real valued row index $r^+$ is found by linear interpolation from indices adjacent detectors rows:

$$w = \frac{\xi - \xi(r_{int}^+, c_{int}+1)}{\xi(r_{int}^++1, c_{int}+1) - \xi(r_{int}^+, c_{int}+1)} \quad (29)$$

$$r^+ = \begin{cases} 0 & \text{if } \xi \leq \xi(0, c_{int}+1) \\ N_{row} - 1 & \text{if } \xi \geq \xi(N_{row}-1, c_{int}+1) \\ r_{int}^+(1-w) + (r_{int}^++1)w & \text{if otherwise} \end{cases} \quad (30)$$

4. Real valued row index $r^*$ corresponding to detector channel c is found by linear interpolation between $r^-$ and $r^+$ as follows $$w = c - \lfloor c \rfloor \quad (31)$$

$$r^* = r^-(1-w) + r^+ w \quad (32)$$

5. Interpolated projection value $P_{int}^m(i,j)$ for filtering line j and channel i is computed using bi-linear interpolation from the acquired detector data $P^m(.,.)$ as follows $$d_c = c - \lfloor c \rfloor$$

$$d_r = r^* - \lfloor r^* \rfloor$$

$$P_{int}^m(i,j) = (1-d_c)(1-d_r)P^m(\lfloor c \rfloor, \lfloor r^* \rfloor) + (1-d_c)d_r P^m(\lfloor c \rfloor, \lfloor r^* \rfloor+1) + d_c(1-d_r)P^m(\lfloor c \rfloor+1, \lfloor r^* \rfloor) + d_c d_r P^m(\lfloor c \rfloor+1, \lfloor r^* \rfloor+1) \quad (33)$$

As previously described, the process includes weighting and filtering steps. For each center view, resampled detector data for the views in the corresponding segment are weighted and filtered along rows. Weighting consists of half-scan redundant data weighting, and fan-beam cone-beam weighting.

Fan-beam cone-beam weighting compensates for ray divergence in the fan-beam and in z-direction. Fan-beam weighting is given by cosine of the detector angle.

Redundant data weighting is required because incomplete helical source trajectory segment and fan-beam geometry is used directly at the backprojection step. Depending on the location in the FOV, there is either one ray or two complementary rays passing through the reconstructed point. In case two rays emanating from the opposite sides of the helical source trajectory pass through the reconstructed point, corresponding samples must be weighted. Weighting ensures that two contributions add up to unity and that for any given reconstruction point, contributions from rays on opposite sides of the helical source trajectory transition smoothly into one another.

For each center view $k_m$, the FDK process utilizes views from $k_m - N_{HS}$ to $k_m + N_{HS}$ to reconstruct the group of voxels associated with the center view $k_m$. Each of the views is weighted and filtered. Weighting depends upon the view angle relative to the center view.

The following process describes processing of the views within reconstruction segment of $2N_{HS}$ for a particular center view $k_m$.

The process is as follows:
1. For each view $k \in [k_m - N_{HS} \ldots k_m + N_{HS}]$ and each row $j \in [1 \ldots N_{row}^{filt}]$ of the resampled detector data $P_{int}^k(i,j)$, each sample $i \in [1 \ldots N_c]$ is weighted, forming weighted data sample $P_W^k(i,j)$ as follows $$P_W^k(i,j) = P_{int}^k(i,j) \cos \gamma_i^{filt} W(k, k_m, i) \tag{34}$$

where $\gamma_i^{filt}$ is the detector angle computed using Eq. 9 and $W(k, k_m, i)$ is the Parker weight, computed as follows. First, relative view angle $\beta_r$ is computed $$\beta_r = \beta(k) - \left(\beta(k_m) - \frac{\pi}{2} - \delta\right) \tag{35}$$

where $\delta$ is half fan angle computed in Eq. 12. Parker weight $W(k, k_m, i)$ is given by $$W(k, k_m, i) = \begin{cases} \sin^2\left(\dfrac{\pi \beta_r}{\delta - \gamma_i^{filt}}\right) & \text{if } \beta_r < (2\delta - 2\gamma_i^{filt}) \\ \sin^2\left(\dfrac{x(x + 2\delta - \beta_r)}{\delta + \gamma_i^{filt}}\right) & \text{if } \beta_r > (\pi - 2\gamma_i^{filt}) \\ 1 & \text{otherwise} \end{cases} \tag{36}$$

2. For each view $k \in [k_m - N_{HS} \ldots k_m + N_{HS}]$, each row $j \in [1 \ldots N_{row}^{flat}]$ of the weighted resampled detector data $P_W^k(i,j) i \in [1 \ldots N_c]$ is filtered as follows:
   (a) Row is zero-padded to length $M_p$. Resulting row is denoted as $P^z(i)$, $i \in [1 \ldots M_p]$.
   (b) Zero-padded row $P^z(i)$ is Fourier transformed forming Fourier transformed row $P^{FT}(i) i \in [1 \ldots M_p]$ $$P^{FT} = FFT[P^z] \tag{37}$$

(c) Fourier transformed row $P^{FT}$ is multiplied with filter frequency response, forming filtered row in the frequency domain $$P^{FTG}(i) = P^{FT}(i) G^{FILT}(i), \forall i \in [1 \ldots M_p] \tag{38}$$

(d) Filtered row is transformed back into the spatial domain, becoming row j of the filtered view k:

$$P_{FILT}^k(i,j) = IFFT[P^{FTG}](i) \forall i \in [1 \ldots N_c] \tag{39}$$

where $G^{FILT}$ is the filter frequency response defined as follows. Equiangular detector ramp filter kernel of even length $M_p$ is given by $$G(j) = \tag{40}$$

$$\begin{cases} \dfrac{1}{4} & \text{if } j - \dfrac{M_P}{2} - 1 = 0 \\ 0 & \text{if } j - \dfrac{M_P}{2} - 1 = \text{even} \\ -\dfrac{1}{\left(j - \dfrac{M_P}{2} - 1\right)^2 x^2 \min^2\left(\left(j - \dfrac{M_P}{2} - 1\right)\dfrac{d}{R_{xd}}\right)} & \text{otherwise} \end{cases}$$

for $j \in [1 \ldots M_p]$. Frequency response of the filter is obtained as $$G^{FILT} = FFT[G] \tag{41}$$

In one embodiment backprojection with adaptive upsampling and sparse computation is used. For each center view $k_m$ selected, the backprojection step utilizes filtered views from $k_m - N_{HS}$ to $k_m + N_{HS}$, to reconstruct the group of voxels $\Omega_m$ associated with the center view $k_m$. Selection of the group of voxels associated with each center view as described above. Each voxel in the group is projected into each of the filtered views. Interpolated filtered projection values are weighted and accumulated, yielding reconstructed voxel value.

It has been observed that, at the edge of the FOV, the sampling interval of projected voxel locations is too large, leading to aliasing artifacts. In order to correct for these aliasing artifacts, projections onto existing views are filtered along the trajectories traced by the reconstructed points projected onto the detector. For a given reconstructed point, filtering is performed by computing interpolated filtered projection values at locations on the detector sampled between projection locations for two adjacent views.

The backprojection step is the most computationally demanding step; therefore, in order to achieve required reconstruction rate, additional feature, sparse projection computation, is introduced. The concept of sparse projection computation is based on the fact that the projected location of a given reconstruction point onto the detector follow a smooth curve on the surface of the detector as a function of view angle. Therefore, it is sufficient to limit exact computation of projected coordinates of the point to only selected key views. The projected coordinates for intermediate views are computed by linearly interpolating projected coordinates computed for adjacent key views.

Adaptive upsampling is integrated with sparse projection computation as follows. Projected coordinates of a reconstruction point are computed for the set of key views. Both projected coordinates of a point on intermediate views and projected coordinates corresponding to upsampled locations are computed by linear interpolation from coordinates computed for adjacent key view. The principle is illustrated in FIG. 19.

Exact computation of projection coordinates for a given voxel is now detailed. For a voxel (x, y, z), real valued row coordinate $r_k^{fl}$, real valued channel coordinate $c_k^{fl}$, and backprojection weight $W_k$ for the view k are computed as follows:
1. The voxel (x, y, z) in the reconstruction coordinate system is transformed into the axial gantry CS using eq. 1. The voxel coordinates in the axial gantry CS are denoted as (s, t, p).
2. Source-to-voxel distance L in the st-plane is computed as $$L = \sqrt{(R_{sc-s})^2 + t^2} \tag{42}$$

3. Detector angle is computed as $$\gamma = \operatorname{atan}\left(\frac{t}{R_{se} - s}\right) \tag{43}$$

4. Real valued detector channel is computed as $$c_k^{fl} = \frac{\gamma R_{sd}}{\omega_d} + s_{cen}^{filt} \tag{44}$$

5. Resampled detector real valued row coordinate is computed as $$f_k^{fl} = \frac{R_{sd}}{h_d(R_{sc}-s)}(t(\tan\Theta - \Psi - \sin\Psi) + p\cos\psi) + \frac{N_{row}^{filt}}{2} - d_{rand}(k \bmod N_{rot}) \quad (45)$$

6. Backprojection weight $W_k$ is computed as follows $$W_k = L^2 \quad (46)$$

The backprojection step is carried out as follows. For a given center view $k_m$, for each voxel $(\hat{i}, \hat{j})$ from the group $\Omega_m$ (coordinates (x, y, z) computed in Eq. 4), the reconstructed value $\hat{I}(\hat{i}, \hat{j}, \overline{m})$ in the tilted image $\hat{I}$ is obtained as follows:
1. The real valued row coordinate $r_0^{fl}$ and real valued channel coordinate $c_0^{fl}$ for the zero key view are initialized as follows:

$$r_0^{fl} = 0 \quad (47)$$

$$c_0^{fl} = 0 \quad (48)$$

2. Filtered projection values, interpolated at the voxel's projected locations for each key view $k \in [1 \ldots 2N_{HS}/N_{sp}]$, are accumulated. For each key view, additional $N_{sp}-1$ linearly interpolated (along the line connecting projected locations for adjacent key views) coordinates are computed and corresponding interpolated projection values are added. Projected location for each view is also sampled $N_u-1$ times along the line connecting projected locations for 2 key views and corresponding interpolated projection values which are also added to the sum.

$$\tilde{I}(\hat{i}, \hat{j}, m) = \sum_{k=1}^{2N_{HS}/N_{sp}} \sum_{l=0}^{N_{sp}-1} \frac{1}{N_u W_k} \sum_{n=0}^{N_u-1} P_B^{k^*}(\tilde{c}_{kln}, \tilde{r}_{kln}) \quad (49)$$

where detector indices $\tilde{r}_{kln}$ and $\vec{c}_{kln}$ and view index $k^*$ are computed as $$\epsilon = \frac{1}{N_u N_{sp}} \quad (50)$$

$$k^- = (k-1)N_{sp} + k_m - N_{HS} \quad (51)$$

$$k^+ = kN_{sp} + k_m - N_{HS} \quad (52)$$

$$k^* = (k-1)N_{sp} + k_m - N_{HS} + l \quad (53)$$

$$d_r = r_{k^+}^{fl} + d_{rand}(k^+ \bmod N_{loop}) - (r_{k^-}^{fl} + d_{rand}(k^- \bmod N_{loop})) \quad (54)$$

$$d_c = c_{k^+}^{fl} - c_{k^-}^{fl} \quad (55)$$

$$\tilde{r}_{kln} = r_{k^-}^{fl} + (lN_u + n)\epsilon d_r - d_{rand}(k^* \bmod N_{loop}) \quad (56)$$

$$\tilde{c}_{kln} = c_{k^-}^{fl} + (lN_u + n)\epsilon d_c \quad (57)$$

$$\quad (58)$$

and where filtered projection value for view k corresponding to real valued detector channel c and real valued detector row r is obtained using bi-linear interpolation as follows $$d_c = c - \lfloor c \rfloor$$

$$d_r = r - \lfloor r \rfloor$$

$$P_B^k(r,c) = (1-d_c)(1-d_r)P_{FILT}^k(\lfloor c \rfloor, \lfloor r \rfloor) + (1-d_c)d_r P_{FILT}^k(\lfloor c \rfloor, \lfloor r \rfloor+1) + d_c(1-d_r)P_{FILT}^k(\lfloor c \rfloor+1, \lfloor r \rfloor) + d_c d_r P_{FILT}^k(\lfloor c \rfloor+1, \lfloor r \rfloor+1) \quad (59)$$

The z-interpolation step performs interpolation in z-direction between tilted planes to form untilted image. For each voxel $(i, j, k) \in \Omega$ of the untilted output image I, the density value is computed as follows:
1. The bottom adjacent tilted plane index $\hat{m}$ is found as follows $$\hat{m} = \underset{m}{\arg\max} z(i, j, m) \leq kd_z \quad (60)$$

where coordinates $z[i, j, m]$ are computed using Eq. 19.
2. The density value $I(i, j, k)$ is computed by linear interpolation from values $\hat{I}(i, j, \hat{m})$ and $\hat{I}(i, j, \hat{m}+1)$ in the tilted image as follows $$d = \frac{kd_z - z(i, j, \hat{m})}{z[i, j, \hat{m}+1] - z[i, j, \hat{m}]} \quad (61)$$

$$I(i, j, k) = d\hat{I}(i, j, \hat{m}+1) + (1-d)\hat{I}(i, j, \hat{m}) \quad (62)$$

While this disclosure has been particularly shown and described with references to preferred embodiments thereof, it will be understood by those skilled in the art that various changes in form and details may be made therein without departing from the spirit and scope of the disclosure as defined by the following claims.

What is claimed is:
1. A CT scanner comprising:
at least one source of X-rays and a multi-row detector array having non-flat and non-circular geometry, both supported so as rotate around an axis of rotation during a scan of an object translated along the said axis, wherein data for each detector is generated as a function of the X-ray energy received; and
a data processor configured so as to perform equiangular resampling with row dithering of the data onto curves in a virtual detector array; wherein said curves project onto tilted lines in a virtual flat detector as to enable tangential filtering of the data.
2. A data processor according to claim 1, wherein the virtual detector array is flat with equidistant detectors.
3. A data processor according to claim 1, wherein the virtual detector array is cylindrical with equiangular detectors.
4. A data processor according to claim 1, wherein the data is half segment data.
5. A data processor according to claim 4, wherein the data processor is configured so as to perform equiangular resampling of the data onto curves in a virtual detector array.
6. A data processor according to claim 4, wherein the data processor is configured so as to perform equiangular resampling of the data with row dithering onto curves in a virtual detector array.
7. A data processor according to claim 1, when the data processor is configured so as to perform fan-beam and cone-beam weighting of the data.

8. A data processor according to claim 1, when the data processor is configured so as to perform redundancy weighting of the data.

9. A data processor according to claim 1, when the data processor is configured so as to perform tangential filtering of the data.

10. A data processor according to claim 1, when the data processor is configured so as to perform adaptive upsampling of the data.

11. A data processor according to claim 1, wherein the data processor is configured so as to backproject the data with sparse computation so as to produce back projected image voxels.

12. A data processor according to claim 11, when the data processor is configured so as to perform Z-axis interpolation of the back projected image voxels.

* * * * *